(12) United States Patent
Reinhardt et al.

(10) Patent No.: US 11,663,512 B2
(45) Date of Patent: May 30, 2023

(54) QUANTUM ANNEALING DEBUGGING SYSTEMS AND METHODS

(71) Applicant: D-WAVE SYSTEMS INC., Burnaby (CA)

(72) Inventors: Steven P. Reinhardt, Eagan, MN (US); Andrew D. King, Vancouver (CA); Loren J. Swenson, Burnaby (CA); Warren T. E. Wilkinson, Burnaby (CA); Trevor Michael Lanting, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 17/584,600

(22) Filed: Jan. 26, 2022

(65) Prior Publication Data
US 2022/0222558 A1 Jul. 14, 2022

Related U.S. Application Data

(63) Continuation of application No. 15/881,307, filed on Jan. 26, 2018, now Pat. No. 11,263,547.
(Continued)

(51) Int. Cl.
*G06N 10/00* (2022.01)
*G05B 19/042* (2006.01)

(52) U.S. Cl.
CPC ............ *G06N 10/00* (2019.01); *G05B 19/042* (2013.01); *G05B 2219/25071* (2013.01)

(58) Field of Classification Search
CPC ........ G06N 10/00; G06N 3/0472; G06N 7/08; G06N 3/0445; G06N 7/005; G06N 3/08;
(Continued)

(56) References Cited

U.S. PATENT DOCUMENTS 7,135,701 B2 11/2006 Amin et al.
7,253,654 B2 8/2007 Amin
(Continued)

FOREIGN PATENT DOCUMENTS

CN 103249368 B 1/2016
CN 112771549 A 5/2021
(Continued)

OTHER PUBLICATIONS

Amin, M., "Searching for Quantum Speedup in Quasistatic Quantum Annealers," arXiv:1503.04216v2 [quant-ph] Nov. 19, 2015, 5 pages.
(Continued)

*Primary Examiner* — Mouloucoulaye Inoussa
(74) *Attorney, Agent, or Firm* — Cozen O'Connor

(57) ABSTRACT

Computational systems and methods employ characteristics of a quantum processor determined or sampled between a start and an end of an annealing evolution per an annealing schedule. The annealing evolution can be reinitialized, reversed or continued after determination. The annealing evolution can be interrupted. The annealing evolution can be ramped immediately prior to or as part of determining the characteristics. The annealing evolution can be paused or not paused immediately prior to ramping. A second representation of a problem can be generated based at least in part on the determined characteristics from an annealing evolution performed on a first representation of the problem. The determined characteristics can be autonomously compared to an expected behavior, and alerts optionally provided and/or the annealing evolution optionally terminated based on the comparison. Iterations of annealing evolutions may be performed until an exit condition occurs.

21 Claims, 15 Drawing Sheets

Related U.S. Application Data

(60) Provisional application No. 62/452,106, filed on Jan. 30, 2017.

(58) Field of Classification Search
CPC ...... G06N 5/003; G06N 5/022; G05B 19/042; B82Y 10/00; G06F 15/78; G06F 9/30145; G06F 17/13; G06F 17/18; G06F 17/17; G06F 15/80; G06F 17/11; G06F 15/76; A61N 5/1031; H04L 9/0852; H04L 39/223; H04L 27/18; H04L 39/025; H01P 5/08; H03K 19/195; A61B 6/482; A61B 6/032; G06T 11/003; G06T 11/005
See application file for complete search history.

(56) References Cited

U.S. PATENT DOCUMENTS

| | | | |
|---|---|---|---|
| 7,418,283 B2 | 8/2008 | Amin | |
| 7,876,248 B2 | 1/2011 | Berkley et al. | |
| 8,008,942 B2 | 8/2011 | Van et al. | |
| 8,035,540 B2 | 10/2011 | Berkley et al. | |
| 8,190,548 B2 | 5/2012 | Choi | |
| 8,195,596 B2 | 6/2012 | Rose et al. | |
| 8,244,650 B2 | 8/2012 | Rose | |
| 8,421,053 B2 | 4/2013 | Bunyk et al. | |
| 8,494,993 B2 | 7/2013 | Harris et al. | |
| 8,504,497 B2 | 8/2013 | Amin | |
| 8,560,282 B2 | 10/2013 | Love et al. | |
| 8,854,074 B2 | 10/2014 | Berkley | |
| 9,495,644 B2 | 11/2016 | Chudak et al. | |
| 9,727,824 B2 | 8/2017 | Rose et al. | |
| 9,881,256 B2 | 1/2018 | Hamze et al. | |
| 10,339,466 B1 | 7/2019 | Ding et al. | |
| 2002/0184166 A1* | 12/2002 | Jackson | G06N 5/02 706/14 |
| 2004/0000666 A1* | 1/2004 | Lidar | G06N 10/00 257/31 |
| 2005/0224784 A1 | 10/2005 | Amin et al. | |
| 2006/0225165 A1 | 10/2006 | Maassen et al. | |
| 2008/0109500 A1* | 5/2008 | Macready | B82Y 10/00 708/2 |
| 2008/0176750 A1* | 7/2008 | Rose | B82Y 10/00 505/170 |
| 2009/0121215 A1* | 5/2009 | Choi | G06N 10/00 365/162 |
| 2009/0167342 A1* | 7/2009 | van den Brink | H04L 67/12 326/4 |
| 2009/0299947 A1 | 12/2009 | Amin et al. | |
| 2010/0022820 A1* | 1/2010 | Leuthardt | G16H 20/10 600/27 |
| 2010/0185572 A1* | 7/2010 | Bonabeau | G06N 3/126 706/13 |
| 2010/0228694 A1 | 9/2010 | Le et al. | |
| 2011/0031994 A1 | 2/2011 | Berkley | |
| 2011/0060710 A1* | 3/2011 | Amin | G06F 15/16 706/13 |
| 2011/0060780 A1 | 3/2011 | Berkley et al. | |
| 2012/0254586 A1* | 10/2012 | Amin | G06N 10/00 712/E9.002 |
| 2013/0218974 A1* | 8/2013 | Cao | H04W 4/08 709/204 |
| 2013/0275351 A1* | 10/2013 | Cantin | G06N 3/086 706/13 |
| 2013/0278283 A1* | 10/2013 | Berkley | G06N 10/00 326/5 |
| 2013/0282636 A1* | 10/2013 | Macready | B82Y 10/00 706/46 |
| 2014/0025606 A1* | 1/2014 | Macready | G06N 5/003 706/14 |
| 2014/0187427 A1* | 7/2014 | Macready | G06N 5/02 706/46 |
| 2014/0223224 A1* | 8/2014 | Berkley | G06N 10/00 714/10 |
| 2014/0250288 A1* | 9/2014 | Roy | B82Y 10/00 712/223 |
| 2014/0324933 A1* | 10/2014 | Macready | G06N 5/003 708/200 |
| 2014/0337612 A1* | 11/2014 | Williams | G06N 10/00 713/100 |
| 2014/0344322 A1* | 11/2014 | Ranjbar | G06F 17/11 708/270 |
| 2015/0006443 A1* | 1/2015 | Rose | G06N 20/00 706/12 |
| 2015/0032993 A1* | 1/2015 | Amin | G06N 10/00 712/42 |
| 2015/0032994 A1* | 1/2015 | Chudak | G06N 10/00 712/42 |
| 2015/0161524 A1* | 6/2015 | Hamze | G06N 7/005 706/12 |
| 2015/0193692 A1* | 7/2015 | Israel | G06N 10/00 706/52 |
| 2015/0205759 A1* | 7/2015 | Israel | G06F 17/11 703/2 |
| 2015/0269124 A1* | 9/2015 | Hamze | G06N 20/00 703/2 |
| 2015/0310350 A1 | 10/2015 | Niskanen et al. | |
| 2015/0363708 A1 | 12/2015 | Amin et al. | |
| 2016/0042294 A1 | 2/2016 | MacReady et al. | |
| 2016/0071021 A1* | 3/2016 | Raymond | G06F 15/76 712/28 |
| 2016/0085616 A1* | 3/2016 | Berkley | G06F 11/10 714/746 |
| 2016/0132785 A1* | 5/2016 | Amin | G06N 10/00 712/42 |
| 2016/0217594 A1 | 7/2016 | Petschke et al. | |
| 2016/0321559 A1* | 11/2016 | Rose | G06N 10/00 |
| 2016/0328253 A1 | 11/2016 | Majumdar | |
| 2017/0161612 A1 | 6/2017 | Hastings et al. | |
| 2017/0177534 A1 | 6/2017 | Mohseni et al. | |
| 2017/0255629 A1 | 9/2017 | Thom et al. | |
| 2017/0264373 A1* | 9/2017 | Krovi | G06N 10/00 |
| 2018/0196780 A1 | 7/2018 | Amin et al. | |
| 2018/0276556 A1 | 9/2018 | Garrison et al. | |
| 2019/0019099 A1 | 1/2019 | Hoskinson et al. | |
| 2019/0080255 A1 | 3/2019 | Allen et al. | |
| 2019/0258952 A1 | 8/2019 | Denchev | |
| 2019/0266510 A1 | 8/2019 | Yarkoni et al. | |
| 2020/0226197 A1 | 7/2020 | Woerner et al. | |
| 2020/0234172 A1 | 7/2020 | King et al. | |
| 2020/0311589 A1 | 10/2020 | Ollitrault et al. | |
| 2021/0279631 A1 | 9/2021 | Pichler et al. | |
| 2022/0101170 A1 | 3/2022 | Denchev | |

FOREIGN PATENT DOCUMENTS

| | | |
|---|---|---|
| WO | 2015103375 A1 | 7/2015 |
| WO | 2016029172 A1 | 2/2016 |
| WO | 2016183213 A1 | 11/2016 |
| WO | 2016210018 A1 | 12/2016 |
| WO | 2017075246 A1 | 5/2017 |

OTHER PUBLICATIONS

Berkley, A.J. et al., "Tunneling Spectroscopy Using a Probe Qubit," arXiv:1210.6310v2 [cond-mat.supr-con], Jan. 3, 2013, 5 pages.

Conway et al., Quantum Computing in the Real World, IDC Technology Spotlight, Apr. 2016.

Harris et al., "Experimental Demonstration of a Robust and Scalable Flux Qubit," arXiv:0909.4321v1, Sep. 24, 2009, 20 pages.

Johnson et al., "Scalable Control System for a Superconducting Adiabatic Quantum Optimization Processor," Superconductor Science & Technology (2010).

King et al., "Observation of topological phenomena in a programmable lattice of 1,800 qubits", arXiv:1803.02047 [quant-ph], Mar. 6, 2018, 17 pages.

Krzakala et al., On the path integral representation for quantum spin models and its application to the quantum cavity method and to Monte Carlo simulations, arXiv:0807.2553v2[cond-mat.stat-mech], Oct. 21, 2008.

(56) References Cited

OTHER PUBLICATIONS

Lanting et al., "Entanglement in a Quantum Annealing Processor," Physical Review X 4:021041, 2014. (14 pages).

Neal, Radford M, "Annealed Importance Sampling", arXiv:physics/9803008 [physics.comp-ph], Sep. 4, 1998, 25 pages.

Orivati, Andrea, Our Top 10 Patent Picks From 2019. InQuartik. Retrieved May 29, 2020. https://www.inquartik.com/inqo-2019-most-important-patents/.

Childs, "Quantum Information Processing in Continuous Time", MIT (2004) Thesis (Year:2004), 140 pages.

Non Final Office Action for U.S. Appl. No. 16/858,108, dated Sep. 21, 2022, 24 pages.

Somma, et al., "Quantum Speedup by Quantum Annealing", Physical Review Letters (2012) (year:2012), 5 pages.

Brown, et al., "A fault-tolerant non-Clifford gate for the surface code in two dimensions", Science Advances, May 22, 2020, vol. 6, Issue 21, 25 pages.

Calderbank, et al., "Good quantum error-correcting codes exist", Phys. Rev. A54, 1098—Published Aug. 1, 2996, 4 pages.

Knill, Fault-Tolerant Postselected Quantum Computation: Schemes, arXiv:quant-ph/0402171v1, Feb. 23, 2004, 17 pages.

Nagayama, et al., "Sureface code error correction on a defective lattice", IOP Publishing, New J. Phys. 19 (2017) 29 pages.

Blume-Kohout et al., "Streaming Universal Distortion-Free Entanglement Concentration"; IEEE Transactions on Information Theory Year: 2014; vol. 60, Issue 1; Journal Article' Publisher: IEEE; 17 pages.

Chancellor, "Modernizing Quantum Annealing Using Local Searches"; arXiv:1606.06833v1 [quant-ph] Jun. 22, 2016, 22 pages.

Hen et al., "Solving the Graph Isomorphism Problem with a Quantum Annealer," arXiv:1207.1712v2, Aug. 8, 2012, 9 pages.

International Search Report for PCT Application No. PCT/US2017/036387 dated Oct. 20, 2017, 3 pages.

Johnson et al., "Quantum annealing with manufactured spins," Nature 473:194-198, May 12, 2011.

Lanting et al., "Systems and Methods for Quantum Computation Employing Classical Spin Preparation and Reverse Annealing," U.S. Appl. No. 62/417,940, filed Nov. 4, 2016, 57 pages.

Written Opinion for PCT Application No. PCT/US2017/036387 dated Oct. 20, 2017, 11 pages.

Non Final Office Action for U.S. Appl. No. 16/785,125, dated Aug. 8, 2022, 8 pages.

Amin, et al., "Quatum Boltzmann Machine". arXiv:1601.02036v1, Jan. 8, 2016.

* cited by examiner

```
┌─────────────────────────────┐ ╱─ 1702    ╱── 1700
│ Determine whether classical │
│ value of variable at        │
│ beginning of annealing      │
│ evolution is zero for Ising │
│ model problem               │
└─────────────────────────────┘
```

FIG. 17

```
┌─────────────────────────────┐ ╱─ 1802    ╱── 1800
│ Determine whether product   │
│ of two coupled spins at     │
│ beginning of annealing      │
│ evolution is zero for Ising │
│ model problem               │
└─────────────────────────────┘
```

FIG. 18

```
┌─────────────────────────────┐ ╱─ 1902    ╱── 1900
│ Confirm chain(s) of qubits  │
│ is(are) not broken          │
└─────────────────────────────┘
```

FIG. 19

QUANTUM ANNEALING DEBUGGING SYSTEMS AND METHODS

TECHNICAL FIELD

This disclosure generally relates to the field of quantum instruments comprising quantum devices (e.g., qubits, couplers) and methods and techniques for operating the same.

BACKGROUND

Description of the Related Art

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as superposition, tunneling, and entanglement, to perform operations on data. The elements of a quantum computer are not binary digits (bits) but typically are quantum binary digits or qubits.

There are several types of quantum computers. An early proposal from Feynman in 1981 included creating artificial lattices of spins. More complicated proposals followed including a quantum circuit model where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically the ground state, of a system. Similar in some respects to classical simulated annealing, the approach relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of delocalization to reach a global energy minimum more accurately and/or more quickly than classical annealing. In quantum annealing, thermal effects and other noise may be present. The final low-energy state may not be the global energy minimum.

Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of delocalization, sometimes called disorder, during the annealing process.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Programming a classical computer often involves a debugging process in which a programmer examines a state of a program during execution. This is typically done by setting breakpoints in the program, at which the program will pause execution and/or by manually "stepping through" the program, i.e., pausing after each instruction is executed and inspecting the state. These approaches are intuitive in the context of classical computing where instructions are executed discretely and consecutively, as expressed logically in imperative programming languages or, at a lower level, as required in a von Neumann-structured classical computer where control flow is dictated by the contents of an instruction register.

In contrast, quantum processors are modelled on physical systems for which classical debugging methods do not have an intuitive analogue. For instance, observation of quantum states will affect the result of computation, so the familiar debugging logical flow of pausing, inspecting, and resuming poses challenges in a quantum computing context. Additionally, quantum processors are probabilistic, so there may not be a single definitive "state" to examine at any given point in a quantum computation.

Particular modes of quantum computation may provide particular challenges and benefits to debugging. For instance, quantum annealing processors are programmed by modelling a problem in terms of a physical system (e.g., a Hamiltonian, perhaps by first casting the problem as an Ising model or a QUBO). In quantum computation, the state of the processor evolves through a dynamic physical process which is not necessarily divided into discrete operations. The output of the system is heavily dependent on these physical processes, but the processes themselves are complex, opaque, and require a deep knowledge of the processor in order to discern the processes from output alone.

In response to receiving results which diverge from results expected by a programmer (e.g., a result with "broken chains"), the programmer may modify the input problem in an attempt to influence the dynamics of the processor so as to avoid undesirable output. Extremely knowledgeable users may attempt to intuitively adjust the input problem based on the output to avoid particular dynamics, but even this is laborious and error-prone.

Debugging a quantum anneal may include: 1) ensuring that variable dynamics are homogeneous and not frozen until late in the annealing evolution; and 2) ensuring that chains of qubits are working as intended, i.e., are not broken. To homogenize dynamics, one approach is to rely on a posteriori statistical analysis of the final output states of the quantum processor. One approach which employs a static flux offset is time consuming and only measures one qubit at a time.

Another approach guesses the dynamics of a qubit based on the qubits floppiness or final effective field, and is limited in its effectiveness. The various approaches to ensure or measure chain fidelity require annealing to the end of the annealing evolution and determining which chains of qubits break, how often the chains break, where the chains break, or why the chains are breaking, and therefore what can done to remedy such. These approaches provide only a limited picture of the quantum processor dynamics. These processes do not shed any light on what is happening in the intermediate portion of the anneal, where important events are occurring. Freeze out homogenization under these approaches is either slow or inaccurate.

The basic operation of a quantum debugger involves performing a partial evolution of a problem with a quantum processor to arrive at an intermediary anneal point of the annealing evolution, determining or assessing a state of the processor at that intermediary anneal point, and acting on the state or providing the state to a user. The intermediary anneal point can be any point between the start of an annealing evolution and a completion of the annealing evolution. In some instances, the determining or assessing may occur a plurality of times at respective ones of a plurality of intermediary anneal points between the start of an annealing evolution and a completion of the annealing evolution. Determining or assessing a state of the quantum processor at an intermediary anneal point can include determining or assessing a characteristic of the problem's dynamics, particularly where only certain information is required by the user. Determining or assessing a state of the processor at an intermediary anneal point can include reading a state or projected state of the quantum processor on reaching the intermediary anneal point.

In some implementations, several samples are drawn from one or more intermediary-anneal points to provide a spectrum of the problem's dynamics. For example, samples are drawn from one or more intermediary-anneal points (e.g., between a start and an end of an anneal as defined by an anneal schedule). Due to the nature of the quantum effects used by the quantum processor, "reading out" a state can be expected to modify the state of the quantum processor. In some implementations, the quantum processor may be re-initialized (i.e., reset to the settings, states, conditions at the beginning of respective iteration of the annealing evolution) between samples. This can involve some degree of overhead, so in some implementations the annealing evolution of the quantum processor is returned to an approximation of its "pre-readout" state (e.g., via reverse annealing, discussed in U.S. Provisional Patent Application Ser. No. 62/364,169 filed Jul. 19, 2016; U.S. Provisional Patent Application Ser. No. 62/417,940 filed Nov. 4, 2016). In some implementations, the evolution of the quantum processor may be paused at the intermediary-anneal point(s), read out without necessarily ramping or otherwise directly changing the qubits' dynamics, and then resumed. This approach may, however, change results obtained by the quantum processor.

There are multiple techniques to read out state information from the quantum processor, which may affect the selected approach. For instance, one approach is to "ramp" the processor at the intermediary-anneal point(s) to freeze out the dynamics, and then read out the frozen dynamics via conventional read-out techniques, just as would be done at the end of the anneal. Reinitializing the evolution or reverse-annealing can be appropriate in these cases. It is noted that the information read out is a "projection" of the quantum state to the classical space; which provides information about the state of the quantum processor without necessarily providing a complete picture of the quantum state of the quantum processor prior to the ramp of the evolution.

As another example, each qubit of a quantum processor may be weakly coupled to a detector and the detector may provide continuous or pointwise readings of the state of the qubit (e.g., by reading the flux of the respective qubit). In general, the weaker the coupling the less that the quantum state of the quantum processor is likely to be affected. Pausing, reading out, and resuming the annealing evolution may be appropriate in this case.

Other than the choice of the particular mechanics of obtaining state information, there are several extensions and implementations of the debugger's operation.

A user may express a problem in terms of type, for example, identifying a class of problems to which the problem to be processed belongs, such as an Ising problem or QUBO problem. Typically, the problem is executed in its entirety via a number of cycles or iterations of annealing evolution, and results returned offering little or no insight into the process that occurred during the annealing. Understanding why results differ from what is expected is error-prone, laborious, and requires extremely detailed knowledge of the quantum processor and its operation. An extremely knowledgeable user (i.e., one of perhaps a dozen in the world) will then intuitively adjust the values in the Ising model in hopes of overcoming the difference between expected and actual results.

In several of the approaches described herein, a user may provide or specify a profile of expected operation, behavior or dynamics that is expected to occur during the annealing cycles or iterations. For example, a user may provide or specify a profile of expected operation, behavior or dynamics via a set of mathematical models or by identifying a class of problem, such as an Ising problem.

A debugger (e.g., software executing on hardware processor(s)) executes problem (e.g., the (sing model), comparing the execution to the expected behavior, for example, using an anneal pause and intermediary-anneal interrogation of qubit states. The debugger can sample the quantum processor characteristics and/or perform the comparison one or more times during an anneal cycle or iteration, for instance, continually or repeatedly sampling and comparing during any given anneal cycle or iteration. Optionally, if the expected and actual values diverge too much, the debugger can stop the execution, for instance, autonomously stopping the execution. The debugger can stop the execution in a mode or condition in which the user can investigate the state of at least parts of the quantum processor (e.g., qubits, couplers) during the anneal cycle, and contrast the state or condition with the expected behavior. The debugger can also be used in a manual mode, without the expected behavior being specified, for example, stopping the anneal at a given fraction of time through the anneal cycle, allowing the user to manually investigate a state of at least part of the quantum processor (e.g., qubits, couplers).

For instance, the system that implements the debugger may autonomously collect samples from one or more intermediary-anneal points, and compare the actual operation, behavior or dynamics of the quantum processor to the expected operation, behavior or dynamics. The system may optionally provide an alert and/or optionally stop the evolution (e.g., by pausing or by ending operation on the quantum processor) if those samples diverge from the expected profile, for instance, diverging by more than a threshold amount. In some implementations where the anneal was merely paused, the user may select to continue with the anneal in response to an alert.

Particular metrics may be used by the debugger to flag certain events for the user, and optionally to pause, halt or end execution of an annealing evolution or iteration of an annealing evolution on occurrence or detection of a break or exit condition, for instance, based on the metric being met or met within a defined threshold). For example, a change in the product of spins may be indicative of a broken chain of qubits, which is generally an undesirable result if those spins correspond to qubits which are coupled, directly or indirectly, by a chain. Other flaggable events may, for example, include domains freezing out early in the iteration of an annealing evolution. In some implementations, a hybrid computer can even autonomously take corrective action, for example, autonomously strengthening a chain edge in response to detecting a broken chain, thereby implementing quantum auto-debugging.

Additionally or alternatively, a hybrid computing system may implement variable rate annealing, which can be used to modify an amount of time spent near a quantum phase transition. The amount of time can, for example, be increased, for instance, to more thoroughly search for the ground state. The amount of time can, for example, be decreased, for instance, to pass through an avoided crossing and intentionally evolve to an excited state. This can be implemented as a form of auto-debugging. For instance, samples may be taken over a course of an annealing evolution and the intermediary-anneal points at which excited states are likely to be entered identified. Once those points are identified, the user can be notified and/or the hybrid system can autonomously modify the annealing schedules of affected qubits to pass through avoided crossings.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Figure 12A:
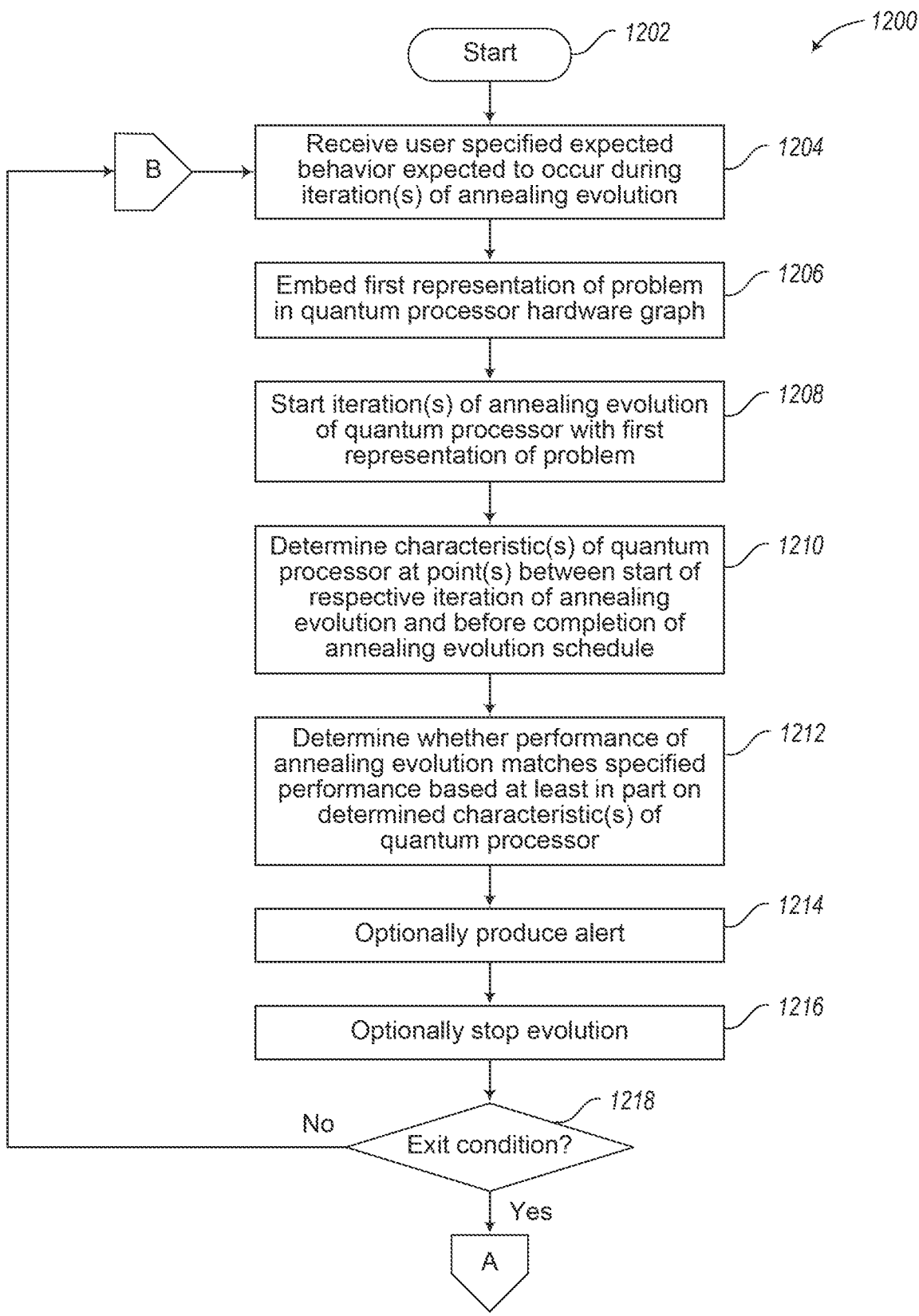
Figure 12B:
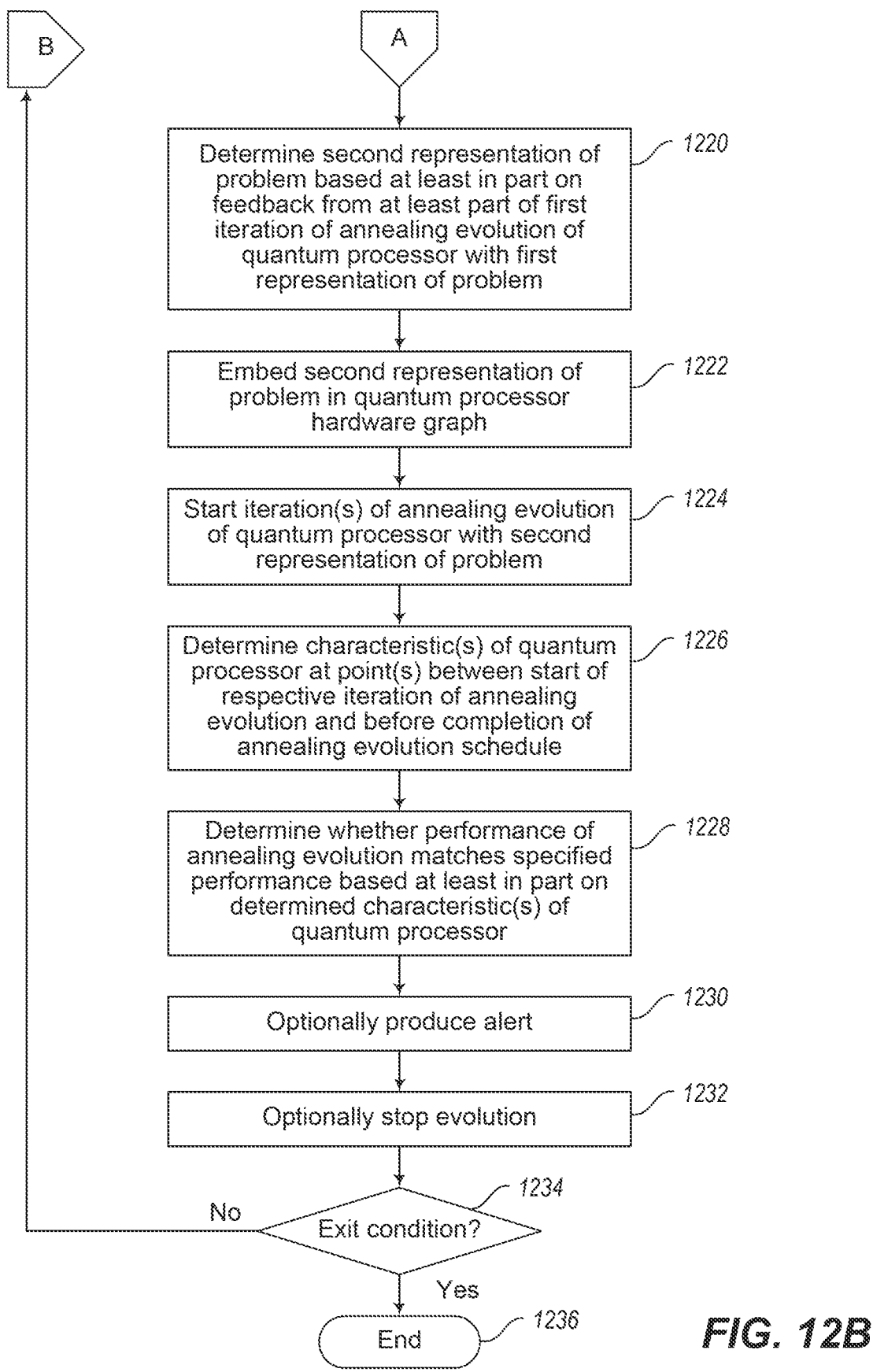

FIGS. 12A and 12B are a flow diagram of a computational method using a hybrid computing system for evolving a quantum processor wherein characteristics of the quantum processor are determined before completion of an annealing evolution schedule, performance of the annealing is evaluated, and optionally an alert is produced, the annealing evolution stopped, or the annealing evolution is reinitialized, reversed, or continued based on the evaluation.

Figure 13:
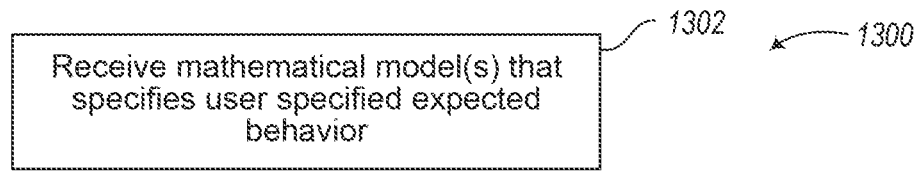

FIG. 13 is a flow diagram of a computational method using a hybrid computing system for evolving a quantum processor wherein user specified expected behavior is received as one or more mathematical models, suitable for use in performing the method of FIGS. 12A and 12B.

Figure 14:
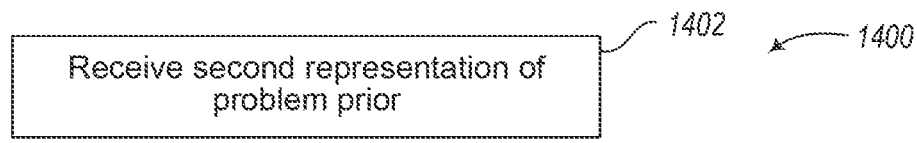

FIG. 14 is a flow diagram of a computational method using a hybrid computing system for evolving a quantum processor wherein a second representation of a problem is received for embedding into a hardware graph of the analog processor, suitable for use in performing the method of FIGS. 12A and 12B.

Figure 15:
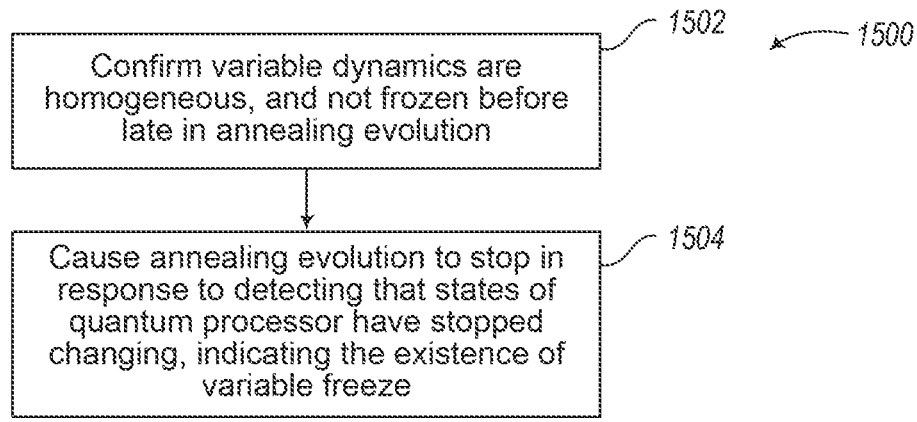

FIG. 15 is a flow diagram of a computational method using a hybrid computing system for evolving a quantum processor wherein variable dynamics of the quantum processor are confirmed to be homogeneous and not frozen before late in an annealing evolution, and the annealing evolution is optionally stopped based on an outcome of the confirmation, suitable for use in performing the method of FIGS. 12A and 12B.

Figure 16:
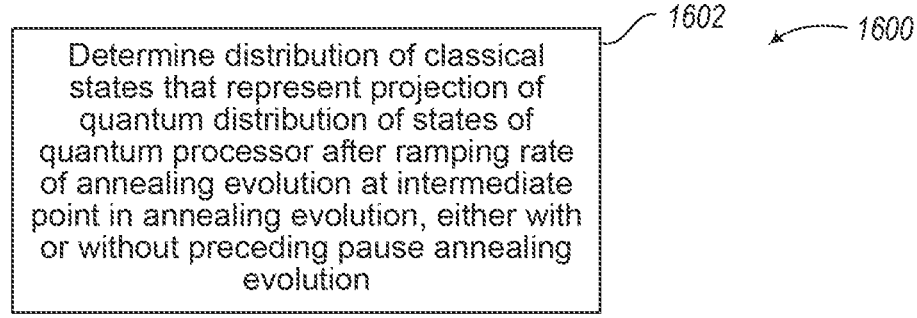

FIG. 16 is a flow diagram of a computational method using a hybrid computing system for evolving a quantum processor wherein a distribution of classical states that represent a projection of a quantum distribution of states of a quantum processor are determined after ramping a rate of an annealing evolution at one or more intermediate points in annealing evolution, either with or without a preceding pause in the annealing evolution, suitable for use in performing the method of FIGS. 12A and 12B.

FIG. 17 is a flow diagram of a computational method using a hybrid computing system for evolving a quantum processor wherein a determination is made as to whether a classical value of a variable at a beginning of an annealing evolution is zero for an Ising model problem, suitable for use in performing the method of FIGS. 12A and 12B.

FIG. 18 is a flow diagram of a computational method using a hybrid computing system for evolving a quantum processor wherein a determination is made as to whether a product of two coupled spins at a beginning of an annealing evolution is zero for an Ising model problem, suitable for use in performing the method of FIGS. 12A and 12B.

FIG. 19 is a flow diagram of a computational method using a hybrid computing system for evolving a quantum processor wherein a confirmation is made that at least one or more chains of qubits is or are not broken, suitable for use in performing the method of FIGS. 12A and 12B.

Figure 20:
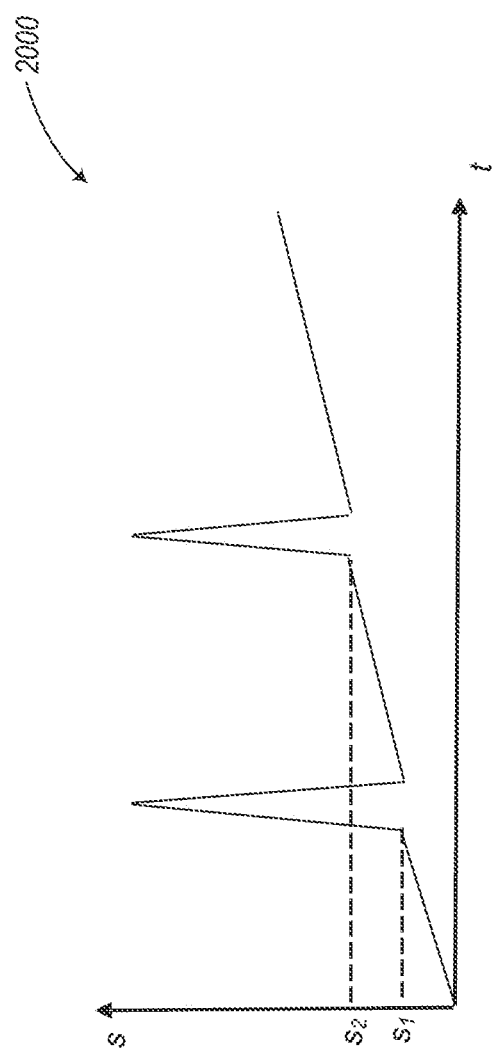

FIG. 20 is a graph showing a progression of an annealing evolution (s) as a function of time, suitable for use in performing the various methods with ramping of the annealing evolution that are described herein.

Figure 21:
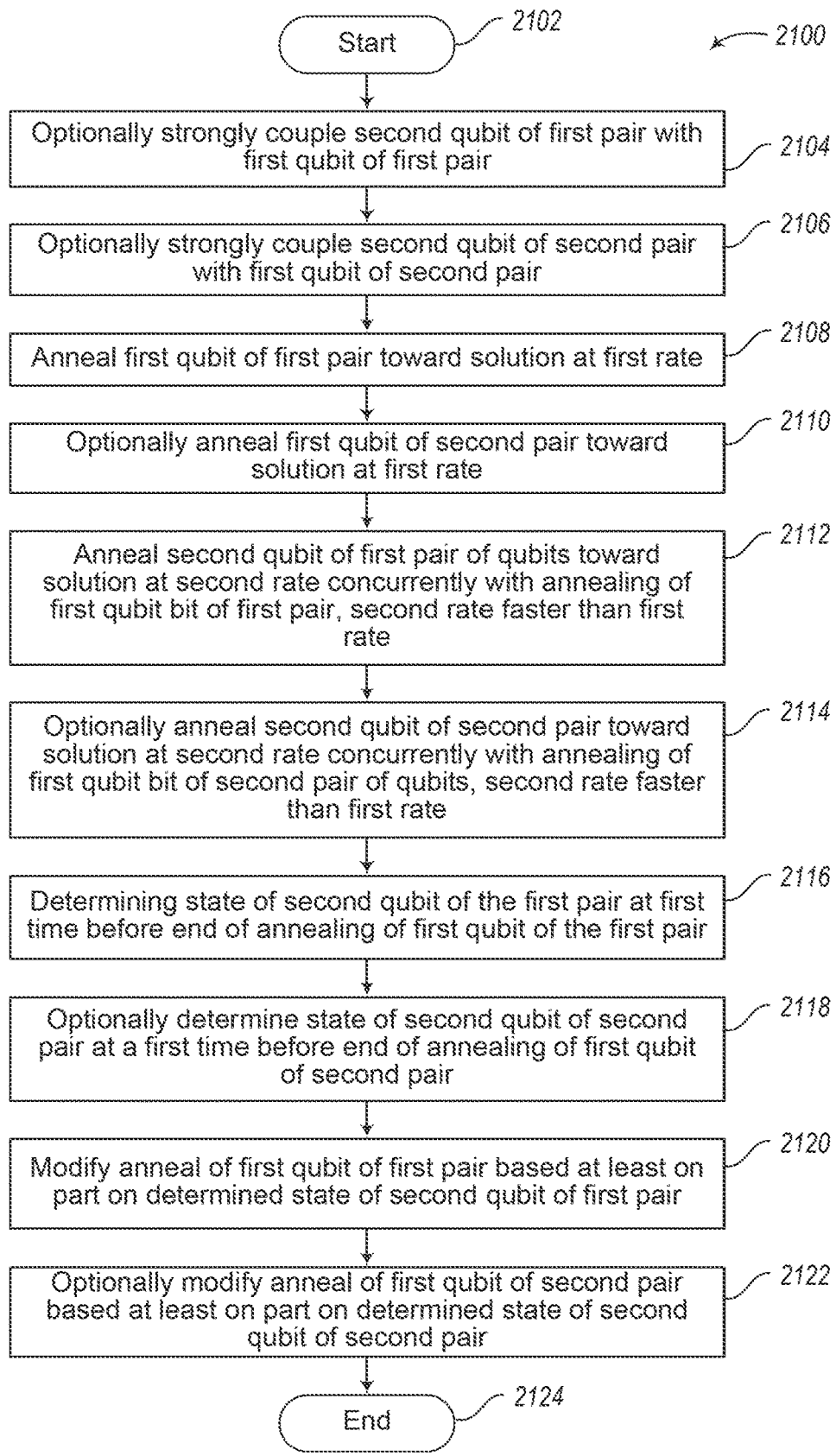

FIG. 21 is a flow diagram of a computational method of operation of a hybrid computing system for evolving a quantum processor wherein at least two components (e.g., qubits) are annealed at different rates, and information about a first component is used to modify an annealing evolution of the second component, suitable for use in performing various methods taught herein.

Figure 22:
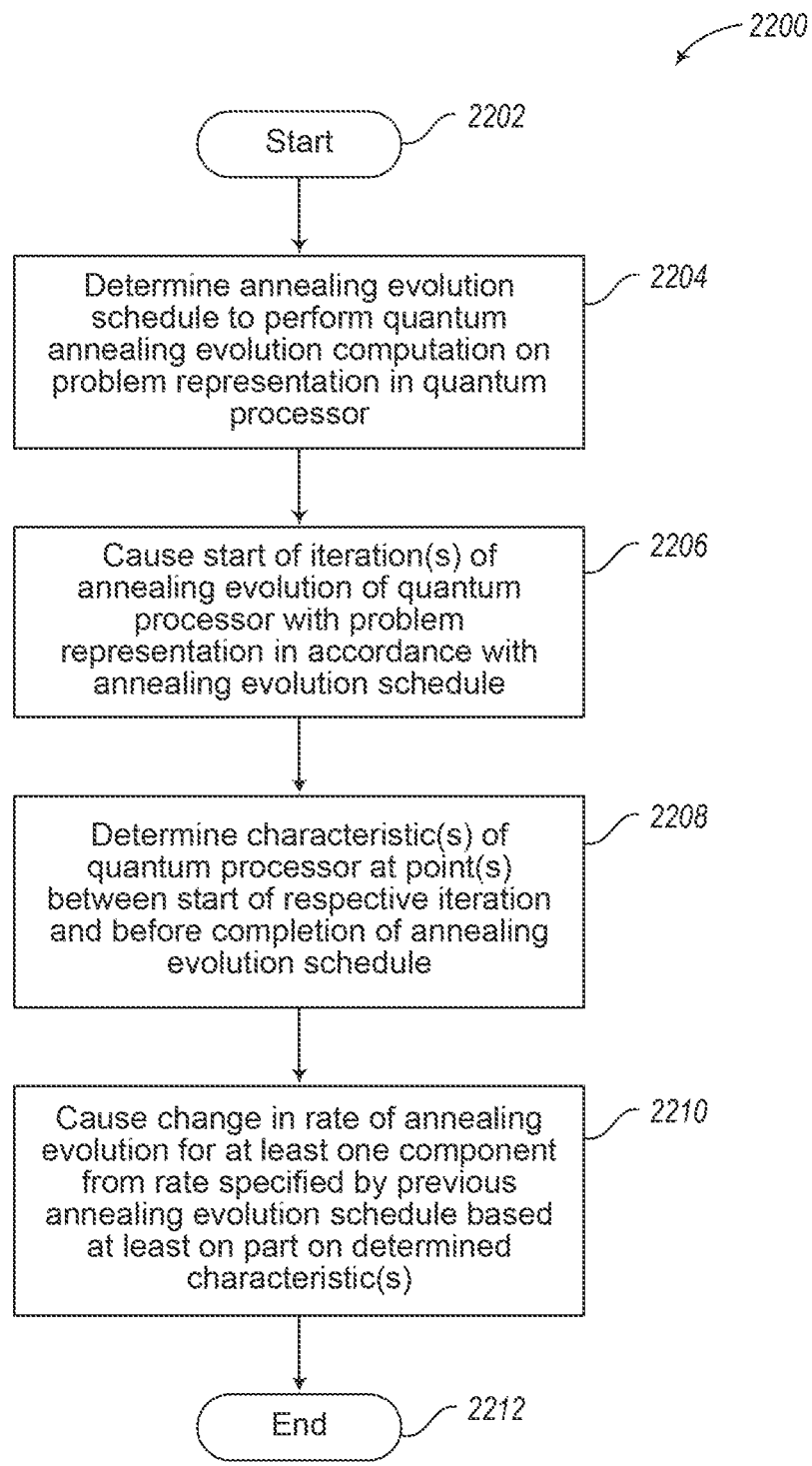

FIG. 22 is a flow diagram of a computational method 2200 of operation of a hybrid computing system for evolving a quantum processor wherein an annealing rate is changed based on determined characteristics which were determined at one or more intermediary points during an annealing evolution, suitable for use in performing various methods taught herein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
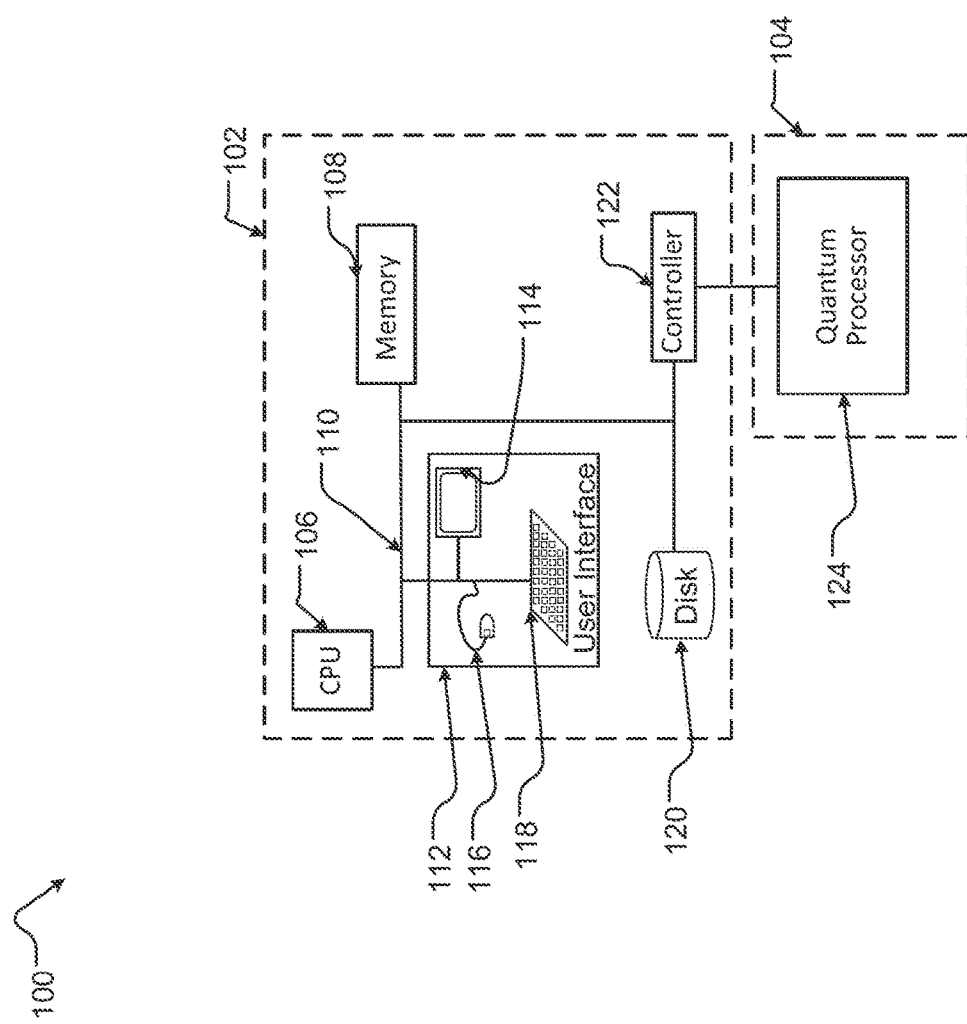
FIG. 1 is a schematic diagram that illustrates a hybrid computing system comprising an analog processor and a digital processor.

FIG. 1 illustrates a hybrid computing system 100 including a digital computer 102 coupled to an analog computer 104. In some implementations the analog computer 104 is a quantum computer. The exemplary digital computer 102 includes a digital processor (CPU) 106 that may be used to perform classical digital processing tasks.

Digital computer 102 may include at least one digital processor (such as central processor unit 106 with one or more cores), at least one system memory 108, and at least one system bus 110 that couples various system components, including system memory 108, to central processor unit 106.

The digital processor may be any logic processing unit, such as one or more central processing units ("CPUs"), graphics processing units ("GPUs"), digital signal processors ("DSPs"), application-specific integrated circuits ("ASICs"), field programmable gate arrays ("FPGAs"), programmable logic controllers (PLCs), etc.

Unless described otherwise, the construction and operation of the various blocks shown in FIG. 1 are of conventional design. As a result, such blocks need not be described in further detail herein, as they will be understood by those skilled in the relevant art.

Digital computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer-or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for digital computer 102.

Although digital computer 102 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104.

In some implementations system memory 108 may store processor-or computer-readable calculation instructions to perform pre-processing, co-processing, and post-processing to analog computer 104. System memory 108 may store a set of analog computer interface instructions to interact with the analog computer 104.

Analog computer 104 may include an analog processor such as quantum processor 124. The analog computer 104 can be provided in an isolated environment, for example, in an isolated environment that shields the internal elements of the quantum computer from heat, magnetic field, and other external noise (not shown).

Figure 2:
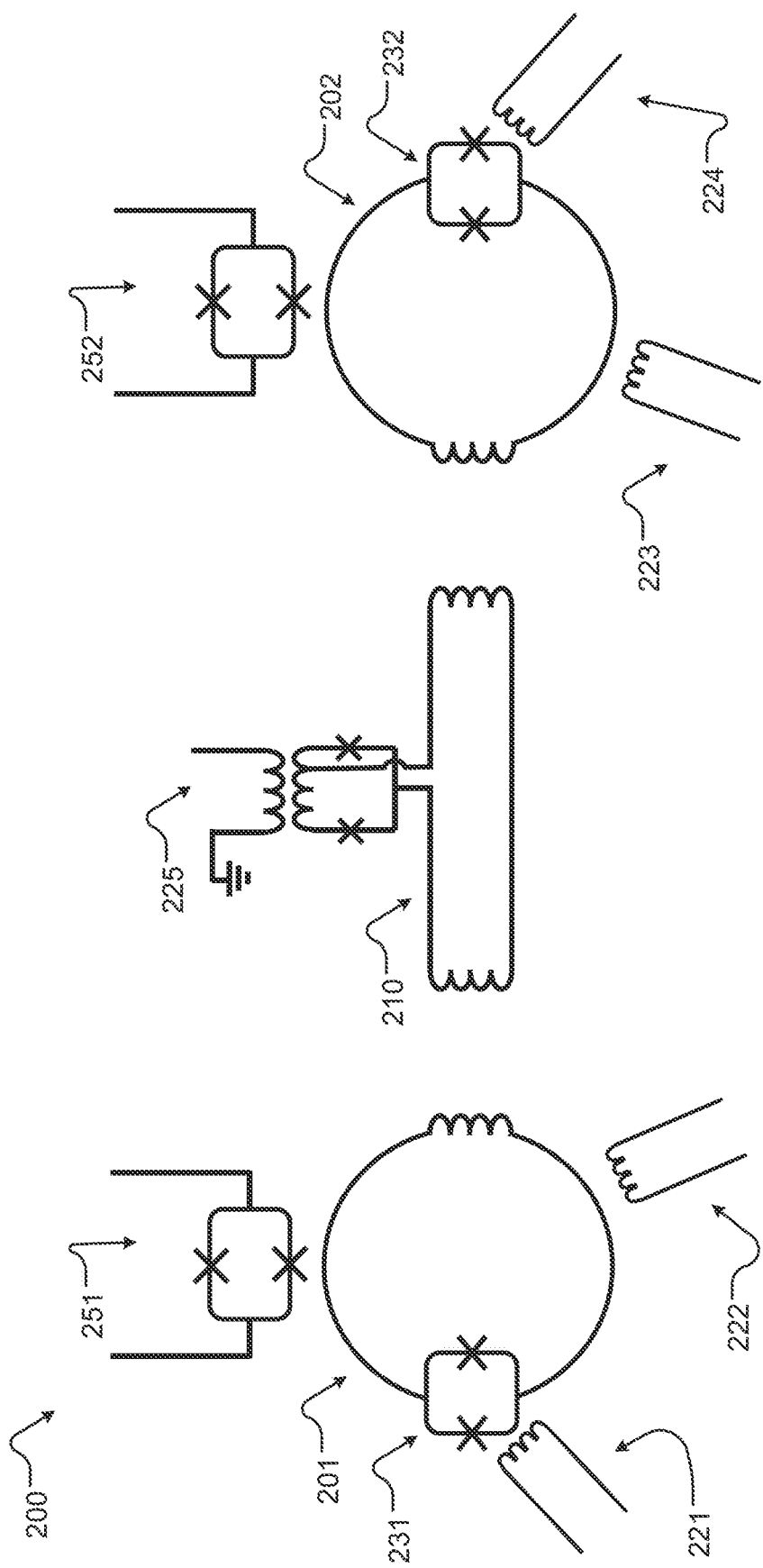
FIG. 2 illustrates a schematic diagram of a portion of a quantum processor.

FIG. 2 is a schematic diagram of a portion of an exemplary superconducting quantum processor 200 designed for quantum annealing (and/or adiabatic quantum computing) which may be used to implement the present systems and devices. The portion of superconducting quantum processor 200 shown in FIG. 2 includes two superconducting qubits 201, and 202. Also shown is a tunable $\sigma_i^z \sigma_j^z$ coupling (diagonal coupling) via coupler 210 therebetween qubits 201 and 202. While the portion of quantum processor 200 shown in FIG. 2 includes only two qubits 201, 202 and one coupler 210, those of skill in the art will appreciate that quantum processor 200 may include any number of qubits and any number of couplers coupling information therebetween.

The portion of quantum processor 200 shown in FIG. 2 may be implemented to physically realize quantum annealing and/or adiabatic quantum computing. Quantum processor 200 includes a plurality of interfaces 221-225 that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 221 and 224 may each be used to couple a flux signal into a respective compound Josephson junction 231 and 232 of qubits 201 and 202, thereby realizing the Ai terms in the system Hamiltonian. Similarly, interfaces 222 and 223 may each be used to apply a flux signal into a respective qubit loop of qubits 201 and 202, thereby realizing the $h_i$ terms in the system Hamiltonian. Furthermore, interface 225 may be used to couple a flux signal into coupler 210, thereby realizing the $J_{ij}$ term(s) in the system Hamiltonian.

Throughout this specification and the appended claims, the term "quantum processor" is used to generally describe a collection of physical qubits (e.g., qubits 201 and 202) and couplers (e.g., coupler 210). The physical qubits 201 and 202 and the coupler 210 are referred to as the "programmable elements" of the quantum processor 200 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{ij}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor.

The programming subsystem may, in operation, receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 221 and 224) used to evolve the programmable elements of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 251 and 252, where readout device 251 is associated with qubit 201 and readout device 252 is associated with qubit 202. In some embodiments, such as shown in FIG. 2, each of readout devices 251 and 252 includes a DC-SQUID inductively coupled to the corresponding qubit. In the context of quantum processor 200, the term "readout subsystem" is used to generally describe the readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in U.S. Pat. No. 8,854,074.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Figure 3A:
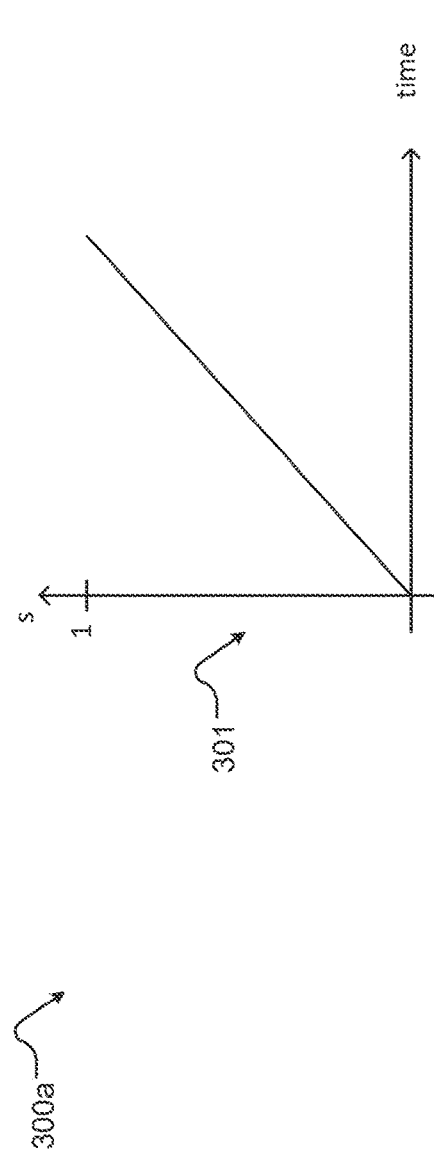
FIG. 3A is a graph showing an evolution of an analog processor where the normalized evolution coefficient increases over time.

FIG. 3A is a graph 300a of an evolution of an analog processor over time. An analog processor may be a quantum processor comprising superconducting qubits and couplers.

Vertical axis 301 represents the normalized evolution coefficient s and the horizontal axis 302 represents the time of the evolution of the analog processor. The normalized evolution coefficient s may represent the normalized flux applied to a compound Josephson junction or the normalized persistent current Ip of a flux qubit. The normalized evolution coefficient s changes monotonically over time, increasing from 0 to a maximum value of 1. A person skilled in the art will understand that the rate of change of the normalized evolution coefficient s over time is shown in FIG. 3A for illustration purposes only and in other implementations the normalized evolution coefficient can increase at a slower or faster rate. In some implementations the normalized evolution coefficient s can change non-linearly. Examples of evolution schedules of analog processors are described in greater detail in Patent Publication No. U.S. 2015/0363708, which is here incorporated by reference.

Techniques described herein are used to operate a hybrid processor comprising an analog processor and a digital processor where the normalized evolution coefficient s may increase and/or decrease over the course of the operation of the hybrid processor. For certain operations it may be desirable to operate the hybrid processor such that the analog processor reaches a predetermined classical spin state at the end of a first or initial evolution. This technique may allow study of problem dynamics or it may be used for obtaining samples from the analog processor.

Figure 3B:
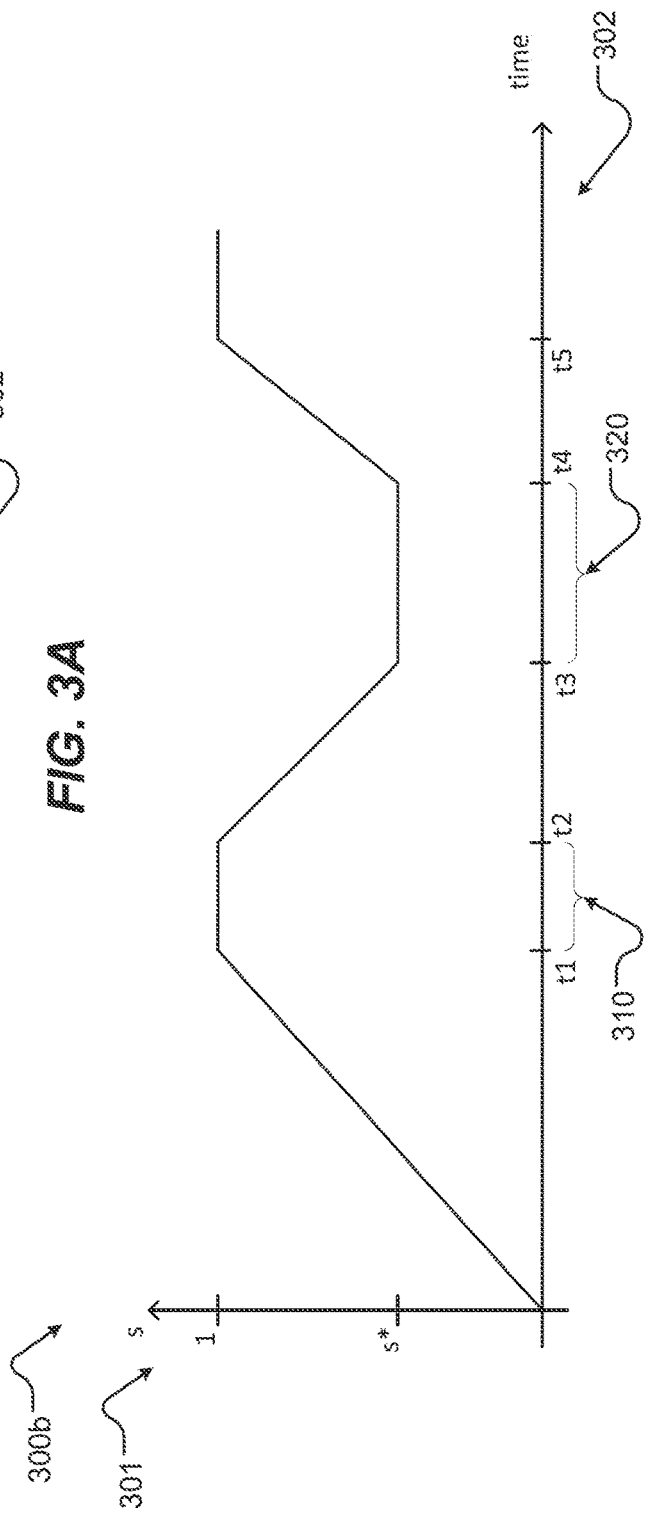
FIG. 3B is a graph showing an exemplary evolution of an analog processor where the normalized evolution coefficient increases and decreases over time during the course of an annealing schedule.

FIG. 3B is a graph of an example evolution 300b of an analog processor over time, operating with a digital processor to form a hybrid processor according to the present systems, methods and apparatus. An analog processor may comprise a quantum processor. Vertical axis 301 represents the normalized evolution coefficient s and the horizontal axis 302 the time of the evolution of the analog processor.

Before the start of example evolution 300b, the hybrid processor may determine a classical spin state and apply preparatory bias to the analog processor to target the evolution of the analog processor towards the classical spin state. Preparatory bias may be applied via the analog processor's circuitry components, for example, via on-chip DACs or analog lines. Preparatory bias may influence the evolution of the analog processor towards any classical state. When the analog processor is a quantum processor with n qubits, there are $2^n$ classical states.

In example evolution 300b the normalized evolution coefficient s increases from 0 to 1 in time $t_1$. A person skilled in the art will understand that the rate of the evolution from 0 to $t_1$ is shown in FIG. 3B for illustration purposes only and in other implementations the rate of the evolution of the analog processor from 0 to $t_1$ may be faster of slower than illustrated. A faster evolution may be referred to as a "ramp" or described as "ramping" relative to another rate of evolution (e.g. a prior rate at which the problem was evolved, a standard and/or benchmark rate of evolution, a user-defined rate, a predominant rate of evolution of that problem, etc.).

At $t_1$ the evolution is paused until time $t_2$. During the time interval $t_1$-$t_2$, shown in FIG. 3B as time interval 310, the digital processor may remove the preparatory bias applied before the start of example evolution 300b. A person skilled in the art will understand that time interval 310 is dependent on the particular hardware and configuration of the analog processor and the digital processor comprising the hybrid processor. Therefore, the time needed for the digital processor to reprogram the analog processor and remove the applied preparatory bias may be different than shown in FIG. 3B. In some implementations time interval 310 may range, for example, from 100 µs to 200 µs. When the analog processor is a quantum processor, the digital processor may pause the evolution and retain the target classical spin state by keeping the energy barrier of the qubits high.

Additionally or alternatively, the hybrid processor may pause the evolution of the analog processor for a time interval longer than needed to reprogram the analog processor, thereby performing other operations, such as readout or post-processing, during time interval 310.

After time interval 310, the evolution of the analog processor resumes in a direction opposite the direction before time interval 310, i.e., backwards. During this phase the normalized evolution coefficient s decreases from 1 to a value s* until time $t_3$. The digital processor may determine the value of s* before the start of example evolution 300b or during time interval 310.

Where the analog processor is a quantum processor, after time interval 310, the energy barriers of the qubits are lowered until an intermediate transverse field and/or tunneling energy is reached. The intermediate transverse field and/or tunneling energy may be determined by the digital processor.

After time $t_3$, the evolution of the analog processor is paused for a time interval 320. Time interval 320 may be determined by the digital processor, either before the start of example evolution 300b or during time interval 310. In some implementations time interval 320 may, for example, range from 1 µs to milliseconds.

A person skilled in the art will understand that the rate of change of the normalized evolution coefficient s between time $t_2$ and time $t_3$ may be the same as the rate of change between 0 and time $t_1$ or may be different. The digital processor may, for example, determine the rate of change of the normalized evolution coefficient.

After time interval 320, the evolution of the analog processor resumes in the same direction as the evolution from 0 to time $t_1$, i.e., the normalized evolution coefficient s increases from value s* to 1 until the analog processor reaches a classical spin state at time $t_5$. Where the analog processor is a quantum processor, the digital processor may raise the energy barriers of the qubits to reach a classical spin state. The classical spin state reached at time $t_5$ may not be the same as the classical spin state reached at time $t_1$, given that the preparatory bias has been removed at time interval 310.

After time $t_5$, the digital processor may read out the classical spin state reached at $t_5$ and may perform post-processing.

In an alternative implementation, the hybrid processor performs post-processing on the obtained classical spin states at time interval 310 using classical methods. Therefore, the evolution of the analog processor is paused for a length of time necessary for the digital processor to perform the post-processing operations. An example of a classical post-processing method is Houdayer cluster moves, performed for a predetermined number of times; however, other classical algorithms can be used.

Alternatively, or in addition, post-processing may be used to improve samples obtained by the analog processor at time $t_1$. In an effort to improve the diversity of the samples obtained from the analog processor, the samples obtained at $t_1$ can be post processed as described above and used as feedback to run the evolution of the analog processor one or more times. During the time interval 310, after the digital processor has completed the post-processing operation, the digital processor sets preparatory bias to the analog processor using the post-processed samples as input to influence the evolution of the analog processor towards obtaining a more diverse set of samples (e.g., obtaining samples from regions in the energy landscape that had not been explored by the analog processor). At time $t_2$ the evolution of the processor resumes backwards as described above until the normalized evolution coefficient reaches value s* at $t_3$. As noted above, the samples obtained at $t_5$ may not be equal to the samples obtained at $t_1$ or the post-processes samples at $t_1$. After time $t_5$ the digital processor may read out the samples obtained by the analog processor.

Figure 4:
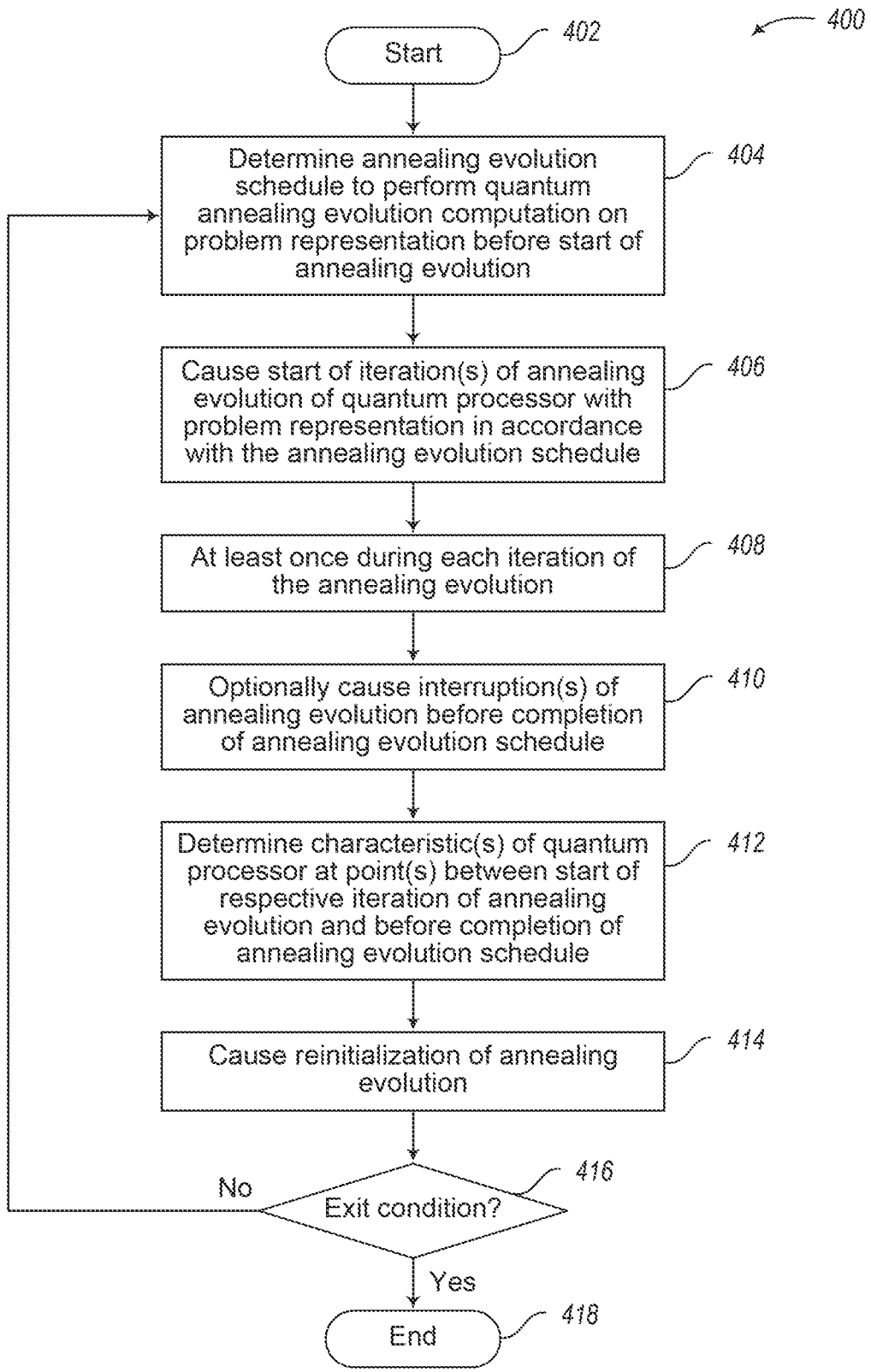
FIG. 4 is a flow diagram of a computational method using a hybrid computing system for evolving a quantum processor wherein characteristics of the quantum processor are determined before completion of an annealing evolution schedule, and the annealing evolution is reinitialized.

FIG. 4 shows a computational method 400 of operation of a hybrid computing system to evolve a quantum processor, wherein characteristics of the quantum processor are determined before completion of an annealing evolution schedule, and the annealing evolution is reinitialized. The determined characteristics relate to a state of the quantum processor during the evolution, and may include (for example) qubit spin, flux, charge, magnetization, and/or other physical manifestations of qubits' states, as well as (or alternatively) coupling strengths between qubits.

The method 400 starts at 402, for example, in response to receipt of a problem, application of power, or a call or invocation from another routine.

At 404, at least one component of a hybrid computing system, for example, a digital processor, determines an annealing evolution schedule to perform a quantum annealing evolution computation on a problem representation. The annealing schedule may be determined before a start of an annealing evolution, which follows the determined annealing schedule.

At 406, at least one component of the hybrid computing system causes a start of one or more iterations of an annealing evolution of a quantum processor with a problem representation embedded in a hardware graph of the quantum processor. The annealing evolution is performed in accordance with the annealing evolution schedule.

At 408, at least one component of the hybrid computing system causes an iterative loop to execute. The iterative loop may execute until an exit condition is reached, for example, a defined number of times, an answer is reached or a consensus answer is reached, and/or an error condition occurs or is detected. Within the iterative loop, at 410, at least one component of the hybrid computing system optionally causes one or more interruptions of the annealing evolution before a completion of the annealing evolution schedule. Within the iterative loop, at 412, at least one component of the hybrid computing system determines characteristic(s) of a quantum processor at point(s) between start of respective iterations of the annealing evolution and before completion of the annealing evolution schedule. The characteristics may be determined after optionally interrupting the annealing evolution. Various ways of determining the characteristics are discussed herein. Within the iterative loop, at 414, at least one component of the hybrid computing system causes a reinitialization of the annealing evolution before a completion of the annealing evolution schedule. The reinitialization reinitializes the various values of the quantum processor to restart the annealing evolution on the same representation or instance of the problem. Within the iterative loop, at 416, at least one component of the hybrid computing system determines whether an exit condition (e.g., defined number of times, answer is reached, consensus answer is reached, and/or an error condition occurred) has been reached.

The method 400 terminates at 418, for example, until invoked again. Alternatively, the method 400 may repeat until a problem or all problems have been processed.

Figure 5:
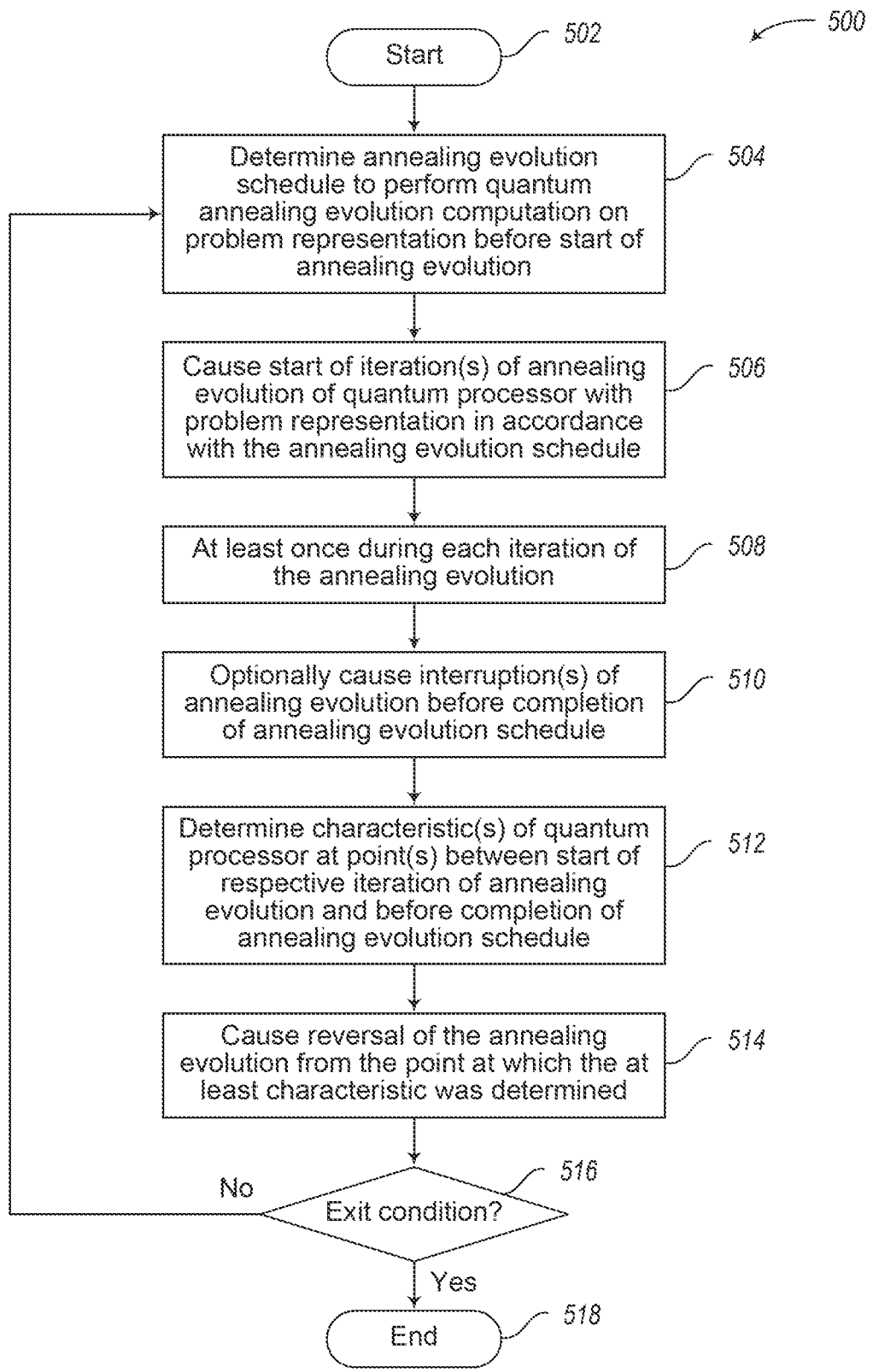
FIG. 5 is a flow diagram of a computational method using a hybrid computing system for evolving a quantum processor wherein characteristics of the quantum processor are determined before completion of an annealing evolution schedule, and the annealing evolution is reversed.

FIG. 5 is a computational method 500 using a hybrid computing system for evolving a quantum processor wherein characteristics of the quantum processor are determined before completion of an annealing evolution schedule, and the annealing evolution is reversed.

The method 500 starts at 502, for example, in response to receipt of a problem, application of power, or a call or invocation from another routine.

At 504, at least one component of a hybrid computing system, for example, a digital processor, determines an annealing evolution schedule to perform a quantum annealing evolution computation on a problem representation. The annealing schedule may be determined before a start of an annealing evolution, which follows the determined annealing schedule.

At 506, at least one component of the hybrid computing system causes a start of one or more iterations of an annealing evolution of a quantum processor with a problem representation embedded in a hardware graph of the quantum processor. The annealing evolution is performed in accordance with the annealing evolution schedule.

At 508, at least one component of the hybrid computing system causes an iterative loop to execute. The iterative loop may execute until an exit condition is reached, for example, a defined number of times, an answer is reached or a consensus answer is reached, and/or an error condition occurs or is detected. Within the iterative loop, at 510, at least one component of the hybrid computing system optionally causes one or more interruptions of the annealing evolution before a completion of the annealing evolution schedule. Within the iterative loop, at 512, at least one component of the hybrid computing system determines characteristic(s) of a quantum processor at point(s) between start of respective iteration of the annealing evolution and before completion of the annealing evolution schedule. The characteristics may be determined after optionally interrupting the annealing evolution. Various ways of determining the characteristics are discussed herein. Within the iterative loop, at 514, at least one component of the hybrid computing system causes a reversal of the annealing evolution, before a completion of the annealing evolution schedule. Various ways of reversing the annealing evolution are discussed elsewhere herein. Within the iterative loop, at 516, at least one component of the hybrid computing system determines whether an exit condition (e.g., defined number of times, answer is reached, consensus answer is reached, and/or an error condition occurred) has been reached.

The method 500 terminates at 518, for example, until invoked again. Alternatively, the method 500 may repeat until a problem or all problems have been processed.

Figure 6:
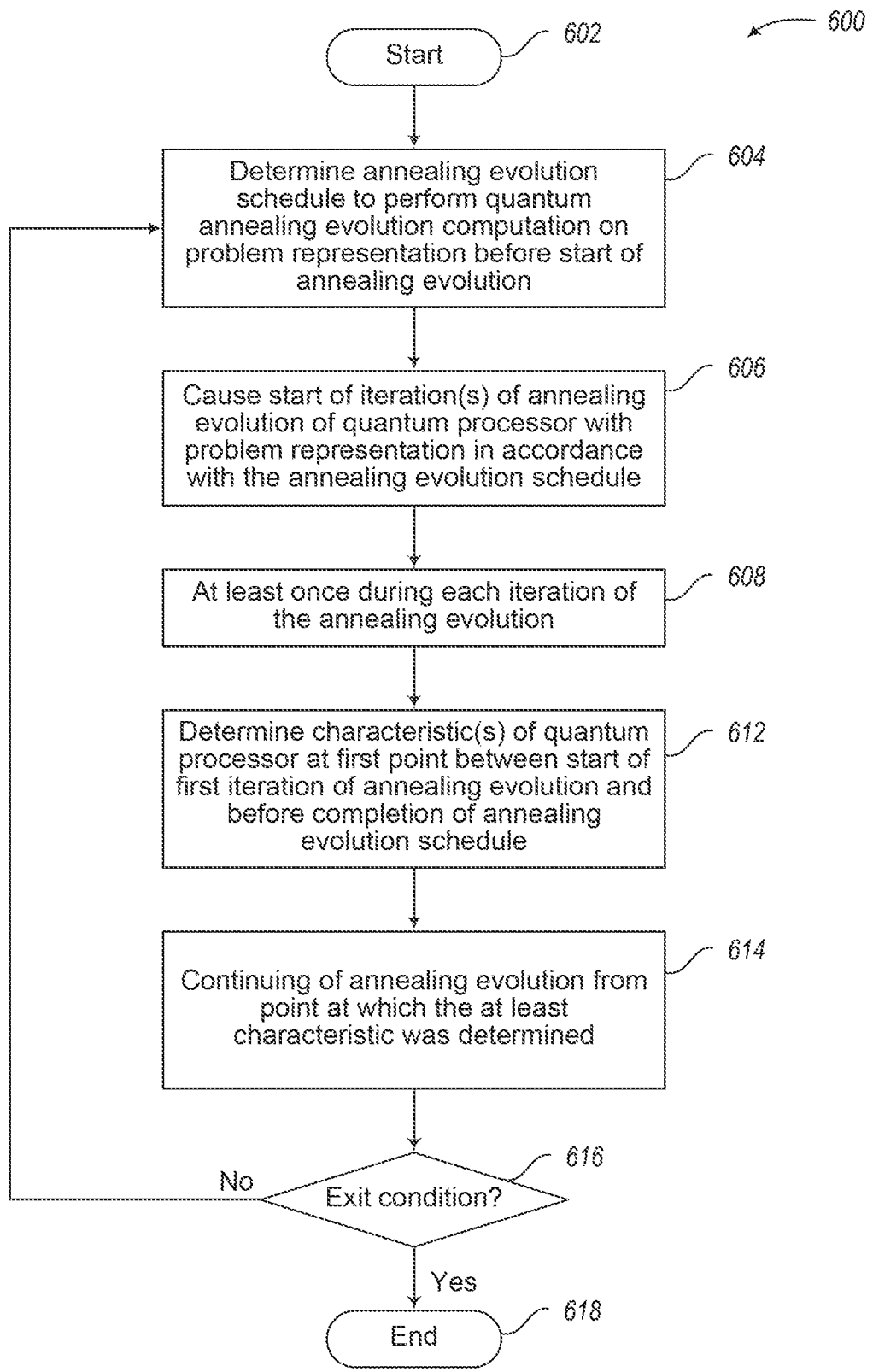
FIG. 6 is a flow diagram of a computational method using a hybrid computing system for evolving a quantum processor wherein characteristics of the quantum processor are determined before completion of an annealing evolution schedule, and the annealing evolution is continued after the determination.

FIG. 6 shows a computational method 600 of operation of a hybrid computing system for evolving a quantum processor wherein characteristics of the quantum processor are determined before completion of an annealing evolution schedule, and the annealing evolution is continued after the determination.

The method 600 starts at 602, for example, in response to receipt of a problem, application of power, or a call or invocation from another routine.

At 604, at least one component of a hybrid computing system, for example, a digital processor, determines an annealing evolution schedule to perform a quantum annealing evolution computation on a problem representation. The annealing schedule may be determined before a start of an annealing evolution, which follows the determined annealing schedule.

At 606, at least one component of the hybrid computing system causes a start of one or more iterations of an annealing evolution of a quantum processor with a problem representation embedded in a hardware graph of the quantum processor. The annealing evolution is performed in accordance with the annealing evolution schedule.

At 608, at least one component of the hybrid computing system causes an iterative loop to execute. The iterative loop may execute until an exit condition is reached, for example, a defined number of times, an answer is reached or a consensus answer is reached, and/or an error condition occurs or is detected. Within the iterative loop, at 612, at least one component of the hybrid computing system determines characteristic(s) of a quantum processor at point(s) between the start of respective iteration of the annealing evolution and before completion of the annealing evolution schedule. The characteristics may be determined after optionally interrupting the annealing evolution. Various ways of determining the characteristics are discussed herein. Within the iterative loop, at 614, at least one component of the hybrid computing system causes a continuation of the annealing evolution, without any interruptions of the annealing evolution before the completion of the annealing evolution schedule. Various ways of reversing the annealing evolution are discussed elsewhere herein. Within the iterative loop, at 616, at least one component of the hybrid computing system determines whether an exit condition (e.g., defined number of times, answer is reached, consensus answer is reached, and/or an error condition occurred) has been reached.

The method 600 terminates at 618, for example, until invoked again. Alternatively, the method 600 may repeat until a problem or all problems have been processed.

Figure 7:
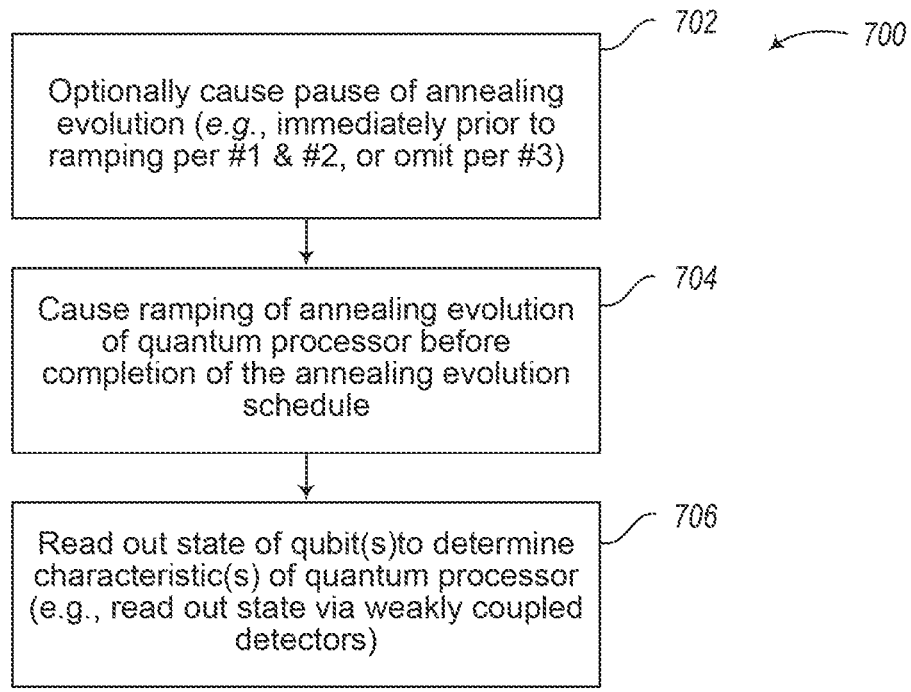
FIG. 7 is a flow diagram of a computational method using a hybrid computing system for evolving a quantum processor wherein an annealing evolution is optionally paused and then ramped in order to determine the characteristics of the quantum processor before completion of an annealing evolution schedule, suitable for use in performing the methods of FIGS. 4-6.

FIG. 7 shows a computational method 700 of operation of a hybrid computing system for evolving a quantum processor wherein an annealing evolution is optionally paused and then ramped in order to determine the characteristics of the quantum processor before completion of an annealing evolution schedule, suitable for use in performing the methods of FIGS. 4-6.

Optionally at 702, at least one component of the hybrid computing system causes a pause of an annealing evolution of a quantum processor to occur. The pause may, for example, occur immediately prior to the determination the characteristics 412, 512 of the methods 400 (FIG. 4) and 500 (FIG. 5), or as part thereof. The pause is notably absent from the method 600 (FIG. 6).

At 704, at least one component of the hybrid computing system causes a ramping of the annealing evolution of the quantum processor before completion of the annealing evolution schedule. The determination of at least one characteristic of the quantum processor 412, 512, 612 (FIGS. 4, 5, 6) occurs concurrently with or immediately following the ramping of the annealing evolution of the quantum processor.

At 706, at least one component of the hybrid computing system reads out respective states of one or more qubits in order to determine the characteristics of the quantum processor. For example, detectors may be coupled to qubits and the states of the detectors may be influenced by the qubits to which they are coupled. The states of the detectors may be read and used to infer the states of the qubits to which they are coupled. In general, the weaker the coupling, the less that the quantum state of the quantum processor is likely to be affected. In some implementations, the detectors are weakly coupled to the qubits. For example, the strength of a coupling between detector and qubit may be limited to a threshold coupling strength that is dominated by the maximum coupling strength in the problem and/or by the maximum coupling strength between the qubit and other qubits in the problem. For instance, the coupling strength between qubit and detector may be 90%, 50%, 10%, or some other less-than-100% proportion of the dominating coupling strength.

By ramping at an intermediate point in the anneal, either with or without a preceding pause, it is possible to determine or characterize a distribution of classical states that represents a projection of the quantum distribution of quantum processor states. In simple terms, it is possible to observe what is happening in the quantum processor throughout an anneal. While the projection to the classical space is a sort of shadow of what the quantum processor is doing, it still provides valuable information allowing useful adjustments to be made, for example, recasting a representation of a problem to execute more effectively on the quantum processor.

The expected (classical) value of a variable at a beginning of an anneal should be zero in an Ising model. The same should be true of the product of two coupled spins. By tracking these measurements through the anneal, it is possible to determine where the values stop changing, which indicates when a variable freezes. This provides a new approach for estimating freeze out that can be run in parallel, i.e., for all devices, with no auxiliary devices or fluxes. A possible drawback of such an approach is that the anneal ramp is not instantaneous. It may or may not be advantageous to pause immediately before ramping of the anneal.

Tracking other measurements through the anneal is also potentially useful. When tracking the expected product of two spins with a chain coupling between them, a tendency to break (i.e., go to a product much less than +1, e.g. as low as −1) early in the anneal would likely indicate that the chain edge should be stronger. A tendency to break late in the anneal might indicate that the chain edge should be stronger or that the chain must be more dynamical. One way to make a chain more dynamical is, for example, to delay it in the anneal.

EXAMPLE

1. For a mesh of important values of s, e.g., {0:20; 0:21; . . . , 0:69; 0:70}, do the following:
    (a) Run the problem many times with a fast ramp at s. Gather the set S(s) of samples.
    (b) For each qubit q, do the following:
        i. Analyze the statistics of S(s) with respect to q.
        ii. Gather the function $F_q(s)$, defined as the average value of q at point s.
    (c) For each pair of coupled qubits q, q' do the following:
        i. Analyze the statistics of S(s) with respect to the product q·q'
        ii. Gather the function $G_q^{q'}(s)$, defined as the average value of q·q' at point s.
2. Now analyze these functions $F_q$ and $G_q^{q'}$ and apply the knowledge to "debug" the system.

In the case where there are no fields, i.e., the input Ising problem (h,J) hash=0, each function $F_q(s)$ should ideally be zero everywhere for every q. If h is nonzero, then $F_q$ can approach ±1 at some point in the anneal. The earlier this occurs, the earlier q "decides" on a value, and the more we might delay q in order to homogenize dynamics with other qubits.

Whether or not there are fields, each function $G_q^{q'}(s)$ can go to near ±1 at some point in the anneal; the earlier this happens, the earlier this coupler "decides" to be frustrated or unfrustrated. A qubit incident to many early-deciding couplers can likely be delayed in order to homogenize dynamics with other qubits.

If a chain coupling between q and q' has $G_q^{q'}(s)$ tend to a value much less than 1 at an early point in the anneal, it may indicate that the chain is insufficiently dynamic It may be appropriate to delay the qubits in such a case. If it tends to a value much less than 1 later in the anneal, it may indicate that the chain coupling is insufficient to ensure chain fidelity. It may be appropriate to increase the chain coupling in such a case.

Figure 8:
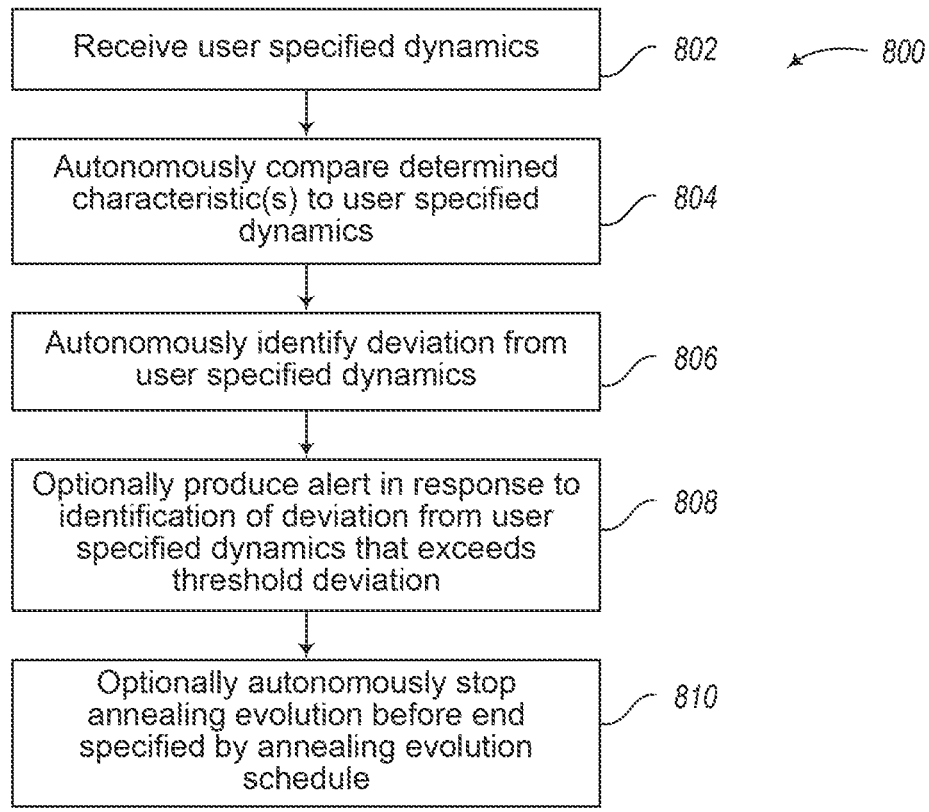
FIG. 8 is a flow diagram of a computational method using a hybrid computing system autonomously identifying deviation of the determined characteristics of the quantum processor from user specified dynamics, suitable for use with the methods of FIGS. 4-7.

FIG. 8 shows a computational method 800 of operation of a hybrid computing system autonomously identifying deviation of the determined characteristics of the quantum processor from user specified dynamics, suitable for use with the methods of FIGS. 4-7.

At 802, at least one component of the hybrid computing system receives a set of user specified dynamics.

At 804, at least one component of the hybrid computing system autonomously compares a set of determined characteristics to the set of user specified dynamics.

At 806, at least one component of the hybrid computing system autonomously identifies one or more deviations of the set of determined characteristics from the set of user specified dynamics.

Optionally at 808, at least one component of the hybrid computing system produces one or more alerts in response to an identification of a deviation from the set of user specified dynamics, for example, a deviation that exceeds a defined threshold deviation. For example, the at least one component can produce an electronic notification or message, cause a visual display (e.g., flashing light, color change) and/or an aural (e.g., beep) or tactile alert.

Optionally at 810, in response to detection of the deviation, the at least one component of the hybrid computing system autonomously stops the annealing evolution before an end thereof as specified by the annealing evolution schedule.

Figure 9:
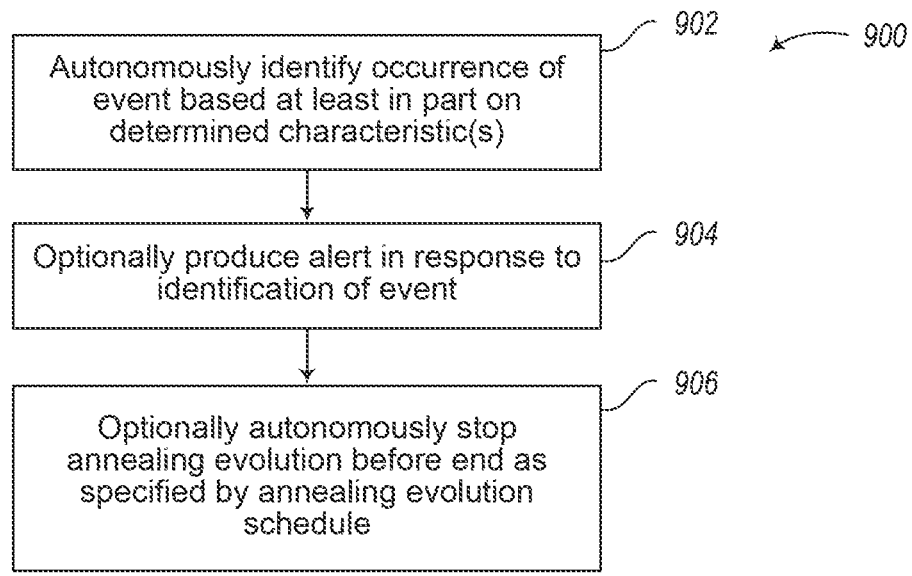
FIG. 9 is a flow diagram of a computational method using a hybrid computing system to autonomously identify occurrence of events during an annealing evolution, provide an alert and optionally stop the annealing evolution in response to the event, suitable for use with the methods of FIGS. 4-8.

FIG. 9 shows a computational method 900 of operation of a hybrid computing system to autonomously identify occurrence of events during an annealing evolution, provide an alert and optionally stop the annealing evolution in response to the event, suitable for use with the methods of FIGS. 4-8.

At 902, at least one component of the hybrid computing system autonomously identifies an occurrence of at least one event based at least in part on the determined characteristics of the quantum processor as determined during the annealing evolution of the quantum processor. The events may be one of a set of defined events.

Optionally at 904, at least one component of the hybrid computing system produces an alert in response to an identification of an occurrence of one or more events. For example, the at least one component can produce an electronic notification or message, cause a visual display (e.g., flashing light, color change) and/or an aural (e.g., beep) or tactile alert.

Optionally at 906, at least one component of the hybrid computing system optionally autonomously stops the annealing evolution before an end thereof as specified by the annealing evolution schedule.

Alternatively, at least one component of the hybrid computing system can even autonomously take corrective action. For example, at least one component of the hybrid computing system can autonomously strengthen a chain edge in response to detecting a broken chain, thereby implementing quantum auto-debugging.

Figure 10:
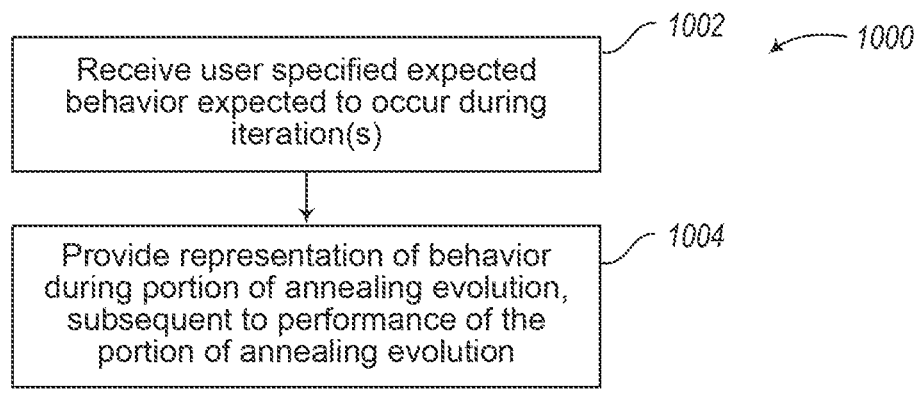
FIG. 10 is a flow diagram of a computational method using a hybrid computing system to receive user specified expected behavior of at least part of a quantum processor expected to occur during iteration(s) of an annealing evolution and to provide a representation of actual behavior of the part(s) of the quantum processor, suitable for use with the methods of FIGS. 4-9.

FIG. 10 shows a computational method 1000 of operation of a hybrid computing system to receive user specified expected behavior of at least part of a quantum processor expected to occur during iteration(s) of an annealing evolution and to provide a representation of actual behavior of the part(s) of the quantum processor, suitable for use with the methods of FIGS. 4-9.

At 1002, at least one component of the hybrid computing system receives a user specified expected behavior of the quantum processor or portions thereof, which user specified expected behavior is expected to occur during at least one portion of the annealing evolution of at least one of the iterations.

At 1004, at least one component of the hybrid computing system provides a representation of a behavior that occurred during at least a portion of the annealing evolution of the quantum processor. For example, the at least one component (e.g., control system) of the hybrid computing system may provide the representation to an end user device. The provision of the representation typically occurs subsequent to a performance of the respective portion of the annealing evolution.

Figure 11:
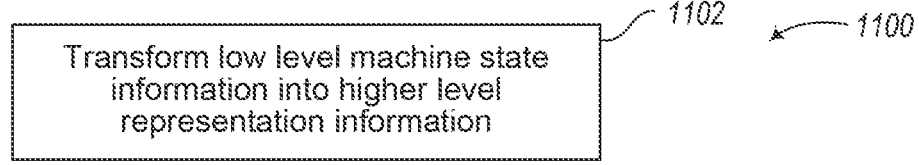
FIG. 11 is a flow diagram of a computational method using a hybrid computing system to transform low level machine state information into higher level representation information, suitable for use with the methods of FIGS. 4-10.

FIG. 11 shows a computational method 1100 of operation of a hybrid computing system to transform low level machine state information into higher level representation information, suitable for use with the methods of FIGS. 4-19.

At 1102, at least one component of the hybrid computing system (e.g., control system) transforms a set of low level machine state information into a set of higher level representation information. For example, the at least one component can transform a set of low level machine state information that represents a behavior that occurred during at least a portion of the annealing evolution of the quantum processor into a set of higher level representation information, which is more readily understood by a human technician. The user can find where her specification of the problem is not what she intended or conceivably find and identify improvements in the quantum annealer itself that will deliver better behavior.

FIGS. 12A and 12B show a computational method 1200 of operation of a hybrid computing system for evolving a quantum processor wherein characteristics of the quantum processor are determined before completion of an annealing evolution schedule, performance of the annealing is evaluated, and optionally an alert is produced, the annealing evolution stopped, or the annealing evolution is reinitialized, reversed, or continued based on the evaluation.

The method 1200 starts at 1202, for example, in response to receipt of a problem, application of power, or a call or invocation from another routine.

At 1204, at least one component of the hybrid computing system receives a user specified expected behavior of the quantum processor, the user specified expected behavior which specifies a behavior of the quantum processor expected to occur during one or more iterations of the annealing evolution.

At 1206, at least one component of the hybrid computing system embeds a first representation of a problem in a hardware graph of the quantum processor. Various techniques of embedding are discussed elsewhere herein an in the various commonly assigned patent literature which is incorporated herein by reference.

At 1208, at least one component of the hybrid computing system starts one or more iterations of an annealing evolution of the quantum processor with the first representation of the problem embedded therein.

During each iteration of the annealing evolution on the first representation of the problem, at 1210 at least one component of the hybrid computing system determines a set of characteristics of the quantum processor at one or more points of time between a start of a respective iteration of the annealing evolution and before a completion of an annealing evolution schedule.

During each iteration of the annealing evolution on the first representation of the problem, at 1212 at least one component of the hybrid computing system determines whether a performance of the annealing evolution matches a specified performance, for example, based at least in part on the set of determined characteristics of the quantum processor.

During each iteration of the annealing evolution on the first representation of the problem, optionally at 1214 at least one component of the hybrid computing system produces an alert. For instance, at least one component of the hybrid computing system produces an alert in response to the performance of the annealing evolution of the quantum processor failing to match or satisfy a specified performance. The at least one component can, for example, produce an electronic notification or message, cause a visual display (e.g., flashing light, color change) and/or an aural (e.g., beep) or tactile alert.

During each iteration of the annealing evolution on the first representation of the problem, optionally at 1216 at least one component of the hybrid computing system stops the annealing evolution. For instance, at least one component of the hybrid computing system can stop at least the respective iteration of the annealing evolution in response to the performance of the annealing evolution of the quantum processor failing to match or satisfy a specified performance.

During each iteration of the annealing evolution on the first representation of the problem, optionally at 1218 at least one component of the hybrid computing system determines if an exit condition has occurred. The exit condition can, for example, constitute the performance of the annealing evolution of the quantum processor failing to match or satisfy a specified performance. Additionally or alternatively, the exit condition can, for example, be completion of a defined number of iterations, an answer is reached, a consensus answer is reached, and/or an error condition has occurred.

At 1220, at least one component of the hybrid computing system determines a second representation of the problem based at least in part on a set of feedback from at least part of a first iteration of an annealing evolution of the quantum processor with the first representation of problem embedded therein. For example, the second representation of the problem may comprise a modification of the first representation of the problem to follow an alternative annealing evolution schedule.

At 1222, at least one component of the hybrid computing system embeds a second representation of a problem in a hardware graph of the quantum processor. Various techniques of embedding are discussed elsewhere herein and in the various commonly assigned patent literature which is incorporated herein by reference.

At 1224, at least one component of the hybrid computing system starts one or more iterations of an annealing evolution of the quantum processor with the second representation of the problem embedded therein.

During each iteration of the annealing evolution on the first representation of the problem, at 1226 at least one component of the hybrid computing system determines a set of characteristics of the quantum processor at one or more points of time between a start of a respective iteration of the annealing evolution and before a completion of an annealing evolution schedule.

During each iteration of the annealing evolution on the first representation of the problem, at 1228 at least one component of the hybrid computing system determines whether a performance of the annealing evolution matches a specified performance, for example, based at least in part on the set of determined characteristics of the quantum processor.

During each iteration of the annealing evolution on the second representation of the problem, optionally at 1230 at least one component of the hybrid computing system produces an alert. For instance, at least one component of the hybrid computing system produces an alert in response to the performance of the annealing evolution of the quantum processor failing to match or satisfy a specified performance. The at least one component can, for example, produce an electronic notification or message, cause a visual display (e.g., flashing light, color change) and/or an aural (e.g., beep) or tactile alert.

During each iteration of the annealing evolution on the first representation of the problem, optionally at 1232 at least one component of the hybrid computing system stops the annealing evolution. For instance, at least one component of the hybrid computing system can stop at least the respective iteration of the annealing evolution in response to the performance of the annealing evolution of the quantum processor failing to match or satisfy a specified performance.

During each iteration of the annealing evolution on the second representation of the problem, optionally at 1234 at least one component of the hybrid computing system determines if an exit condition has occurred. The exit condition can, for example, constitute the performance of the annealing evolution of the quantum processor failing to match or satisfy a specified performance. Additionally or alternatively, the exit condition can, for example, be completion of a defined number of iterations, an answer is reached, a consensus answer is reached, and/or an error condition has occurred.

The method 1200 terminates at 1236, for example, until invoked again. Alternatively, the method 1200 may repeat until a problem or all problems have been processed.

FIG. 13 shows a computational method 1300 of operation of a hybrid computing system for evolving a quantum processor wherein user specified expected behavior is received as one or more mathematical models, suitable for use in performing the method of FIGS. 12A and 12B.

At 1302, at least one component of the hybrid computing system receives one or more mathematical models that specify a user specified expected behavior.

FIG. 14 shows a computational method 1400 of operation of a hybrid computing system for evolving a quantum processor wherein a second representation of a problem is received for embedding into a hardware graph of the analog processor, suitable for use in performing the method of FIGS. 12A and 12B.

At 1402, at least one component of the hybrid computing system receives a second representation. The second representation may be a different representation of the same fundamental problem as represented by the first representation. The second representation can, in some implementations, be based on what was learned from attempting to solve the first representation of the problem, for example the need to increasing a certain chain strength.

FIG. 15 shows a computational method 1500 of operation of a hybrid computing system for evolving a quantum processor wherein variable dynamics of the quantum processor are confirmed to be homogeneous and not frozen before late in an annealing evolution, and the annealing evolution is optionally stopped based on an outcome of the confirmation, suitable for use in performing the method of FIGS. 12A and 12B.

At 1502, at least one component of the hybrid computing system confirms that a set of variable dynamics are homogeneous, and not frozen before a threshold point in annealing evolution. For example, the threshold point may be determined based on predicted and/or observed dynamics of the problem (e.g. the threshold may be the point s* at which a proportion of qubits in the problem have frozen; the proportion may be, for instance, 10%, 20%, 50%, 80%, or some other suitable proportion), based on a proportion of an annealing evolution (e.g. s*=0.25, 0.5, 0.75, or some other suitable proportion), provided by a user, and/or otherwise obtained.

At 1504, at least one component of the hybrid computing system causes the annealing evolution to stop in response to detecting that one or more states of the components (e.g., qubits, couplers) of the quantum processor have stopped changing, which indicates the existence of a variable freeze.

FIG. 16 shows a computational method 1600 of operation of a hybrid computing system for evolving a quantum processor wherein a distribution of classical states that represent a projection of a quantum distribution of states of a quantum processor are determined after ramping a rate of an annealing evolution at one or more intermediate points in annealing evolution, either with or without a preceding pause in the annealing evolution, suitable for use in performing the method of FIGS. 12A and 12B.

At 1602, at least one component of the hybrid computing system determines a distribution of classical states that represent a projection of a quantum distribution of states of the quantum processor after ramping a rate of annealing evolution at one or more intermediate points in the annealing evolution. Depending on the specific implementation, such can be performed either with, or without, a preceding pause in the annealing evolution immediately before the ramping.

FIG. 17 shows a computational method 1700 of operation of a hybrid computing system for evolving a quantum processor wherein a determination is made as to whether a classical value of a variable at a beginning of an annealing evolution is zero for an Ising model problem, suitable for use in performing the method of FIGS. 12A and 12B.

At 1702, at least one component of the hybrid computing system determines whether a classical value of one or more variables at a beginning of an annealing evolution is zero where the problem is an Ising model problem.

FIG. 18 shows a computational method 1800 of operation of a hybrid computing system for evolving a quantum processor wherein a determination is made as to whether a product of two coupled spins at a beginning of an annealing evolution is zero for an Ising model problem, suitable for use in performing the method of FIGS. 12A and 12B.

At 1802, at least one component of the hybrid computing system determines whether a product of two coupled spins at a beginning of an annealing evolution is zero where the problem is an Ising model problem.

FIG. 19 shows a computational method 1900 of operation of a hybrid computing system for evolving a quantum processor wherein a confirmation is made that at least one or more chains of qubits is or are not broken, suitable for use in performing the method of FIGS. 12A and 12B.

At 1902, at least one component of the hybrid computing system confirms that one or more chains of qubits (e.g., logical qubits) is not broken.

FIG. 20 is a graph 2000 showing a progression of an annealing evolution (s) as a function of time, suitable for use in performing the various methods with ramping of the annealing evolution that are described herein.

Spikes correspond to intermediary-anneal read-outs $s_1$ and $s_2$.

In addition to or in place of the various approaches described above, a hybrid computing system may implement variable rate annealing, which can be used to modify an amount of time spent near a quantum phase transition. The amount of time can, for example, be increased, for instance, to more thoroughly search for the ground state. The amount of time can, for example, be decreased, for instance, to pass through an avoided crossing and intentionally evolve to an excited state. This can be implemented as a form of auto-debugging (i.e., autonomous debugging and adjustment). For instance, a number of samples or determinations of characteristics of the quantum processor may be taken over a course of an annealing evolution on a given problem, and the intermediary-anneal points at which excited states are likely to be entered identified. Once those points are identified, the user can be notified and/or the hybrid system can autonomously modify the annealing schedules of affected qubits to pass through avoided crossings.

In addition to or in place of the various approaches described above, qubits can be paired so that a problem is represented twice, on two parallel sets of qubits. Each pair of qubits can be strongly coupled so that their states correlate. One set of qubits (i.e., one of each pair) is evolved faster than the other set of qubits. The faster-annealing set of qubits can, for example, be ramped at one or more intermediary-anneal points, and/or may be generally evolved faster over the course of the annealing evolution. The results of the faster-annealing qubits may be used to capture an intermediate state of the other ("normally-annealing") set of qubits, thereby providing debugging information. In some implementations, the pairs of qubits might be uncoupled at a point in the anneal where the faster-annealing qubits are ramped.

In addition to or in place of the various approaches described above, a hybrid computing system may generate and/or use spectrographic information via tunneling spectography. Briefly, a probe device (such as a qubit or a specialized device) may be slowed down relative to inspected devices (e.g., down to MHz scale from GHz scale) in order to obtain spectrographic information. This can be done by advancing the annealing process for probe devices. This can avoid the need to adjust annealing signals on a global annealing signal line, which disadvantageously slows down many qubits, even if only one probe qubit is targeted. This makes it possible to, for example, use the per-qubit annealing technique, to adjust the annealing schedule of selected probe devices (e.g., just one, a pair, or any other selected number of probe devices).

FIG. 21 shows a computational method 2100 of operation of a hybrid computing system for evolving a quantum processor wherein at least two components (e.g., qubits) are annealed at different rates, and information about a first component is used to modify an annealing evolution of the second component, suitable for use in performing various methods taught herein. While two pairs of qubits are discussed, this approach can be applied to any number of pairs of qubits or other quantum processor components, devices or elements (e.g., couplers).

The method 2100 starts at 2102, for example, in response to receipt of a problem, application of power, or a call or invocation from another routine.

At 2104, at least one component of a hybrid computing system, for example, a digital processor, optionally strongly couples a second qubit of a first pair of qubits with a first qubit of the first pair of qubits. The first and second qubits of the first pair of qubits may remain strongly coupled throughout at least the respective iteration of an annealing evolution of the first and the second qubits of the first pair of qubits.

At 2106, at least one component of a hybrid computing system, for example, a digital processor, optionally strongly couples a second qubit of a second pair of qubits with the first qubit of the second pair of qubits. The first and second qubits of the second pair of qubits may remain strongly coupled throughout at least the respective iteration of an annealing evolution of the first and the second qubits of the second pair of qubits.

At 2108, at least one component of a hybrid computing system, for example, a digital processor, causes annealing of the first qubit of the first pair of qubits toward a solution at a first rate.

At 2110, at least one component of a hybrid computing system, for example, a digital processor, optionally causes annealing of the first qubit of the second pair of qubits toward a solution at a first rate. This first rate may, for example, be the same or different than the first rate at which the first qubit of the first pair of qubits is annealed.

At 2112, at least one component of a hybrid computing system, for example, a digital processor, causes annealing of the second qubit of the first pair of qubits toward the solution at a second rate, concurrently with the annealing of the first qubit bit of the first pair of qubits. The second rate at which the second qubit of the first pair of qubits is annealed is faster than the first rate at which the first qubit of the first pair of qubits is annealed.

At 2114, at least one component of a hybrid computing system, for example, a digital processor, optionally causes annealing of the second qubit of the second pair of qubits toward a solution at a second rate, concurrently with the annealing of the first qubit of the second pair of qubits. The second rate at which the second qubit of the second pair of qubits is annealed is faster than the first rate at which the first qubit of the second pair of qubits is annealed.

At 2116, at least one component of a hybrid computing system, for example, a digital processor, determines a state of the second qubit of the first pair of qubits at a first intermediary time or point, the first intermediary time or point being before an end of the annealing of the first qubit of the first pair of qubits. This allows the hybrid computing system to use one device (e.g., second qubit of the pair) as a proxy for another device (e.g., first qubit of the pair), which is at an advanced state of the annealing evolution relative to the other device.

At 2118, at least one component of a hybrid computing system, for example, a digital processor, optionally determines a state of the second qubit of the second pair of qubits at a first intermediary time or at a point before an end of the annealing of the first qubit of the second pair of qubits. This allows the hybrid computing system to use one device (e.g., second qubit of the pair) as a proxy for another device (e.g., first qubit of the pair), which is at an advanced state of the annealing evolution relative to the other device.

At 2120, at least one component of a hybrid computing system, for example, a digital processor, modifies the annealing of the first qubit of the first pair of qubits based at least in part on the determined state of the second qubit of the first pair of qubits.

At 2122, at least one component of a hybrid computing system, for example, a digital processor, optionally modifies the annealing of the first qubit of the second pair of qubits based at least on part on the determined state of the second qubit of the second pair of qubits.

The method 2100 terminates at 2124, for example, until invoked again. Alternatively, the method 2100 may repeat until a problem or all problems have been processed.

FIG. 22 shows a computational method 2200 of operation of a hybrid computing system for evolving a quantum processor wherein an annealing rate is changed based on determined characteristics which were determined at one or more intermediary points during an annealing evolution, suitable for use in performing various methods taught herein.

The method 2200 starts at 2202, for example, in response to receipt of a problem, application of power, or a call or invocation from another routine.

At 2204, at least one component of a hybrid computing system, for example, a digital processor, determines an annealing evolution schedule to perform a quantum annealing evolution computation on a problem representation in a quantum processor, At 2206, at least one component of a hybrid computing system, for example, a digital processor, causes a start of a number of iterations (e.g., at least a first iteration) of an annealing evolution of the quantum processor, with the problem representation embedded in the quantum processor, in accordance with the annealing evolution schedule.

During a performance of the iteration(s) of the annealing evolution, at 2208 at least one component of a hybrid computing system determines at least one characteristic of the quantum processor at at least a first point in time, between a start of the first iteration of the annealing evolution and before a completion of the annealing evolution schedule.

During a performance of the iteration(s) of the annealing evolution, at 2210 at least one component of a hybrid computing system causes a change in a rate of the annealing evolution from a rate specified by a previous annealing evolution schedule. The change in rate is based at least in part on the determined at least one characteristic of the quantum processor.

The method 2200 terminates at 2212, for example, until invoked again. Alternatively, the method 2200 may repeat until a problem or all problems have been processed.

The above described method(s), process(es), or technique(s) could be implemented by a series of processor readable instructions stored on one or more nontransitory processor-readable media. Some examples of the above described method(s), process(es), or technique(s) are performed in part by a specialized device such as an adiabatic quantum computer or a quantum annealer or a system to program or otherwise control operation of an adiabatic quantum computer or a quantum annealer, for instance, a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned U.S. patent application publications, U.S. patent applications, foreign patents, and foreign patent applications referred to in this specification and/or listed in the Application Data Sheet are incorporated herein by reference, in their entirety, including but not limited to: U.S. Provisional Patent Application Ser. No. 62/364,169 filed Jul. 19, 2016; U.S. Provisional Patent Application Ser. No. 62/417,940 filed Nov. 4, 2016; U.S. Patent Publication No. U.S. 2015/0269124; U.S. Patent Publication No. U.S. 2015/0161524; U.S. Pat. Nos. 7,876,248, 8,035,540, 8,854,074, PCT Patent application PCT/US2016/031885, and Patent Publication U.S. 2015/0363708.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation of a control system communicatively coupled to a quantum processor, the control system comprising at least one processor and at least one nontransitory processor-readable medium that stores at least one of processor-executable instructions or data, the method comprising:
receiving, by the control system, a user specified expected behavior expected to occur during at least one iteration of an annealing evolution, the annealing evolution specified by an annealing evolution schedule;
starting at least a first iteration of the annealing evolution of the quantum processor as specified by the annealing evolution schedule with a first representation of a problem;
at one or more times during a performance of the first iteration of the annealing evolution:
determining, by the control system, at least one characteristic of the quantum processor at least a first point in time between the start of the first iteration of the annealing evolution as specified by annealing evolution schedule and before a completion of the first iteration of the annealing evolution as specified by the annealing evolution schedule; and
determining, by the control system, whether a performance of the annealing evolution matches a specified performance of the user specified expected behavior based at least on part on the determined at least one characteristic of the quantum processor.

2. The method of claim 1 wherein receiving a user specified expected behavior expected to occur during at least one iteration of the annealing evolution includes receiving at least one mathematical model that specifies the user specified expected behavior.

3. The method of claim 1 wherein determining whether a performance of the annealing evolution matches a specified performance of the user specified expected behavior includes autonomously comparing, by the control system, the determined at least one characteristic of the quantum processor to the specified performance of the user specified expected behavior, the specified performance comprising a set of user specified dynamics.

4. The method of claim 3, further comprising:
autonomously identifying, by the control system, a deviation between the set of user specified dynamics and the performance of the first iteration of the annealing evolution.

5. The method of claim 4, further comprising:
producing an alert, by the control system, in response to an identification of a deviation between the set of user specified dynamics and the performance of the first iteration of the annealing evolution that exceeds a threshold deviation.

6. The method of claim 4, further comprising:
autonomously stopping, by the control system, the first iteration of the annealing evolution in response to the identification of a deviation from the set of user specified dynamics that exceeds a threshold deviation.

7. The method of claim 1, further comprising:
receiving, by the control system, the annealing evolution schedule to perform a quantum annealing evolution computation on a problem representation in a quantum processor before starting the first iteration of the annealing evolution; and
causing, by the control system, at least one of: a reinitializing of the annealing evolution, a reversal of the annealing evolution from a first point in time at which the at least one characteristic was determined, or a continuing of the first iteration of the annealing evolution from the first point in time at which the at least one characteristic was determined.

8. The method of claim 1, further comprising:
receiving, by the control system, the annealing evolution schedule to perform a quantum annealing evolution computation on a problem representation in a quantum processor before starting at least the first iteration the annealing evolution; and
causing, by the control system, at least one interruption of the first iteration of the annealing evolution of the quantum processor before completion of the first iteration of the annealing evolution as specified by the annealing evolution schedule.

9. The method of claim 1, further comprising:
embedding the first representation of the problem in a quantum processor hardware graph prior to starting the first iteration of the annealing evolution of the quantum processor with the first representation of the problem;
embedding a second representation of the problem in the quantum processor hardware graph, the second representation of the problem based at least in part on a set of feedback from at least part of the first iteration of the annealing evolution of the quantum processor with the first representation of the problem, the set of feedback including the determination of whether the performance of the first iteration of the annealing evolution matched the specified performance of the user specified expected behavior; and
starting at least one iteration of an annealing evolution of the quantum processor with the second representation of the problem.

10. The method of claim 9, further comprising:
determining, by the control system, the second representation of the problem based at least in part on the set of feedback from at least part of the first iteration of the annealing evolution of the quantum processor with the first representation of the problem.

11. The method of claim 9, further comprising:
receiving the second representation of the problem prior to embedding the second representation of the problem in the quantum processor hardware graph.

12. The method claim 1 wherein determining whether a performance of the annealing evolution matches a specified performance based at least on part of the determined at least one characteristic of the quantum processor includes: confirming that a set of variable dynamics are homogeneous, and that the set of variable dynamics are not frozen before late in annealing evolution.

13. The method of claim 1 wherein determining whether a performance of the annealing evolution matches a specified performance based at least on part of the determined at least one characteristic of the quantum processor includes determining at distribution of classical states that represent a projection of a quantum distribution of states of the quantum processor after ramping a rate of the annealing evolution at an intermediate point in the first iteration of the annealing evolution, either with or without a preceding pause in the first iteration of the annealing evolution.

14. The method of claim 1, further comprising:
causing the first iteration of the annealing evolution to stop in response to detecting that a state of the quantum processor has stopped changing indicating an existence of a variable freeze.

15. The method of claim 1, further comprising:
determining whether a classical value of a variable at a beginning of the first iteration of the annealing evolution is zero for an Ising model problem.

16. The method of claim 1, further comprising:
determining whether a product of two coupled spins at a beginning of the first iteration of the annealing evolution is zero for an Ising model problem.

17. The method of claim 1, further comprising:
confirming that at least one chain of qubits is not broken.

18. A system, comprising:
a quantum processor;
a control system communicatively coupled to the quantum processor, the control system comprising at least one processor and at least one nontransitory processor-readable medium that stores at least one of processor-executable instructions or data which, when executed by the at least one processor, causes the at least one processor to:
receive a user specified expected behavior expected to occur during at least one iteration of an annealing evolution, the annealing evolution specified by an annealing evolution schedule;
start at least a first iteration of an annealing evolution of the quantum processor as specified by the annealing evolution schedule with a first representation of a problem;
at one or more times during a performance of the first iteration of the annealing evolution:
determine at least one characteristic of the quantum processor at at least a first point in time between the start of the first iteration of the annealing evolution as specified by the annealing evolution schedule and before a completion of the first iteration of the annealing evolution as specified by the annealing evolution schedule; and
determine whether a performance of the annealing evolution matches a specified performance of the user specified expected behavior based at least on part on the determined at least one characteristic of the quantum processor.

19. The method of claim 1, further comprising:
in response to the determined at least one characteristic of the quantum processor diverging from the specified performance of the user specified expected behavior by a defined threshold, recasting the problem representation.

20. The method of claim 1, further comprising:
receiving, by the control system, the annealing evolution schedule to perform a quantum annealing evolution computation on a problem representation in a quantum processor before starting at least the first iteration the annealing evolution, the annealing evolution schedule specifying: a varying of an annealing variable from an initial value, through an intermediary value, to a final value over a time interval, the time interval extending from a start of the annealing evolution to a completion of the annealing evolution through an intermediary time between the start of the annealing evolution and before the completion of the annealing evolution.

21. The method of claim 20, further wherein determining, by the control system, at least one characteristic of the quantum processor at at least a first point in time between the start of the annealing evolution schedule and before a completion of the annealing evolution schedule comprises determining the at least one characteristic of the quantum processor during the intermediary time.

* * * * *